US008347534B2

(12) United States Patent
Ruiz

(10) Patent No.: US 8,347,534 B2
(45) Date of Patent: Jan. 8, 2013

(54) RECIRCULATING LEVITATED BEADS FOUNTAIN DISPLAY APPARATUS

(76) Inventor: Iraldo F. Ruiz, Corona, CA (US)

( * ) Notice: Subject to any disclaimer, the term of this patent is extended or adjusted under 35 U.S.C. 154(b) by 13 days.

(21) Appl. No.: 13/068,531

(22) Filed: May 14, 2011

(65) Prior Publication Data

US 2012/0174446 A1 Jul. 12, 2012

Related U.S. Application Data

(63) Continuation-in-part of application No. 11/825,778, filed on Jul. 9, 2007, now Pat. No. 7,963,057.

(51) Int. Cl.
*G06F 19/00* (2006.01)

(52) U.S. Cl. ........................................... 40/406; 428/13

(58) Field of Classification Search .................... 40/410; 239/101, 211, 444, 536, 548, 550, 551, 562; 472/65; 137/625.48, 625.5, 872; 362/512
See application file for complete search history.

(56) References Cited

U.S. PATENT DOCUMENTS 2,385,980 A * 10/1945 Fostos .......................... 273/399
3,116,022 A * 12/1963 Davis ............................ 362/294
4,215,500 A * 8/1980 Sharp ............................. 40/409
4,501,299 A * 2/1985 Klimowicz et al. ...... 137/625.65
4,570,904 A * 2/1986 Mullally .................. 251/129.21
4,583,736 A * 4/1986 Lorraine ................... 273/144 B
4,757,625 A * 7/1988 Watkins .......................... 40/406
4,892,250 A * 1/1990 Fuller et al. ..................... 239/18
4,976,376 A * 12/1990 Williams ........................ 221/24
5,200,239 A * 4/1993 Chen .............................. 428/13
5,340,024 A * 8/1994 Fuller et al. ..................... 239/17
5,353,211 A * 10/1994 Merko .......................... 362/294
5,426,877 A * 6/1995 Lin ................................ 40/406
5,541,822 A * 7/1996 Bamber ........................ 362/190
5,737,860 A * 4/1998 Whigham et al. .............. 40/406
5,794,364 A * 8/1998 Richmond ...................... 40/406
5,899,231 A * 5/1999 Drori ......................... 137/625.5
5,934,558 A * 8/1999 Samayoa et al. ................ 239/20
6,070,348 A * 6/2000 Bianchetti ....................... 40/406
6,085,988 A * 7/2000 Marsh ............................ 239/17
6,152,448 A * 11/2000 Cudlipp .................... 273/144 R
6,153,273 A * 11/2000 Lee Lin .......................... 428/13
6,164,322 A * 12/2000 Najmolhoda et al. ........ 137/540
6,171,495 B1 * 1/2001 Drori ......................... 210/416.1
6,187,394 B1 * 2/2001 Johnson et al. ................. 428/13
6,416,197 B1 * 7/2002 Chang ............................ 362/96
6,539,654 B2 * 4/2003 Lin ................................ 40/406
6,550,169 B1 * 4/2003 Sena et al. ...................... 40/410
6,681,508 B2 * 1/2004 Unger et al. .................... 40/406
6,836,986 B2 * 1/2005 Ootsuta et al. .................. 40/439
6,944,982 B2 * 9/2005 Schroeter et al. ............... 40/428
7,040,050 B2 * 5/2006 Skinner .......................... 40/410

(Continued)

*Primary Examiner* — Tashiana Adams
*Assistant Examiner* — Shin Kim
(74) *Attorney, Agent, or Firm* — William L. Chapin

(57) ABSTRACT

A display apparatus (20) includes a blower (44) which provides a pressurized flow of air to lower air inlet openings of tubular nozzles (35) which protrude upwardly from a collection platform (21) to thus propel lightweight beads (56) from an upper bead discharge opening of a bore (41) through each nozzle into arc-shaped trajectories which simulate flowing water. Each nozzle (35) has a plurality of circumferentially spaced apart openings (58) through the cylindrical wall (57) of the nozzle, adjacent to the platform, for drawing into the bore of the nozzle by a venturi effect beads (56) which have fallen onto the platform. One or more illumination sources (63) spaced radially apart from the nozzles (35) illuminate the airborne beads (56).

16 Claims, 19 Drawing Sheets

U.S. PATENT DOCUMENTS

| | | | | |
|---|---|---|---|---|
| 7,188,443 | B2 * | 3/2007 | Collida et al. | 40/406 |
| 7,322,137 | B2 * | 1/2008 | Machala | 40/439 |
| 7,331,362 | B2 * | 2/2008 | Huei | 137/597 |
| 7,484,863 | B1 * | 2/2009 | Aubrey | 362/294 |
| D587,832 | S * | 3/2009 | Bergmann et al. | D26/63 |
| 2006/0188831 | A1 * | 8/2006 | Hess et al. | 431/125 |

* cited by examiner

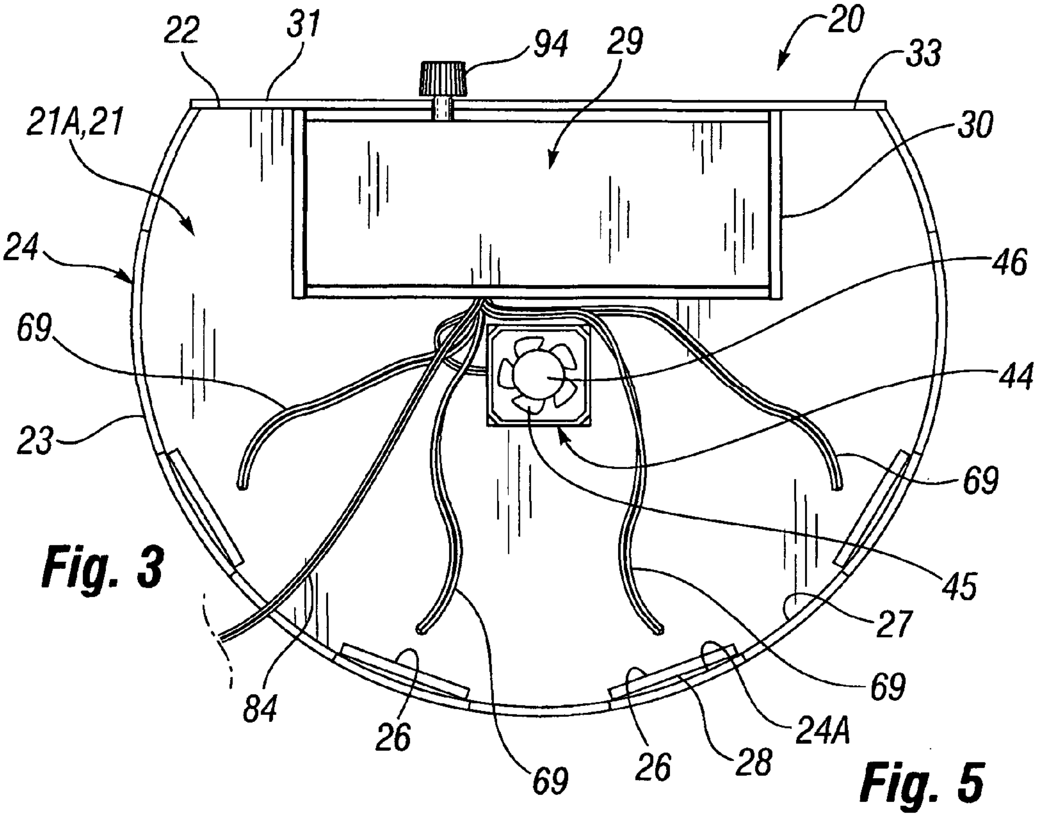
Fig. 3
Fig. 5
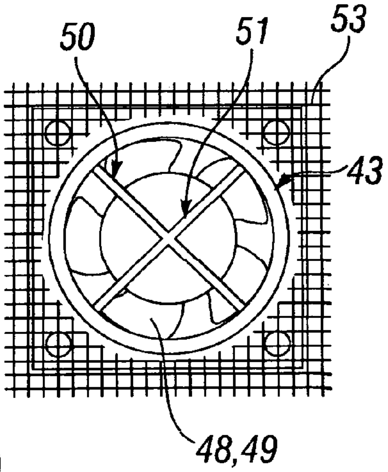
Fig. 4
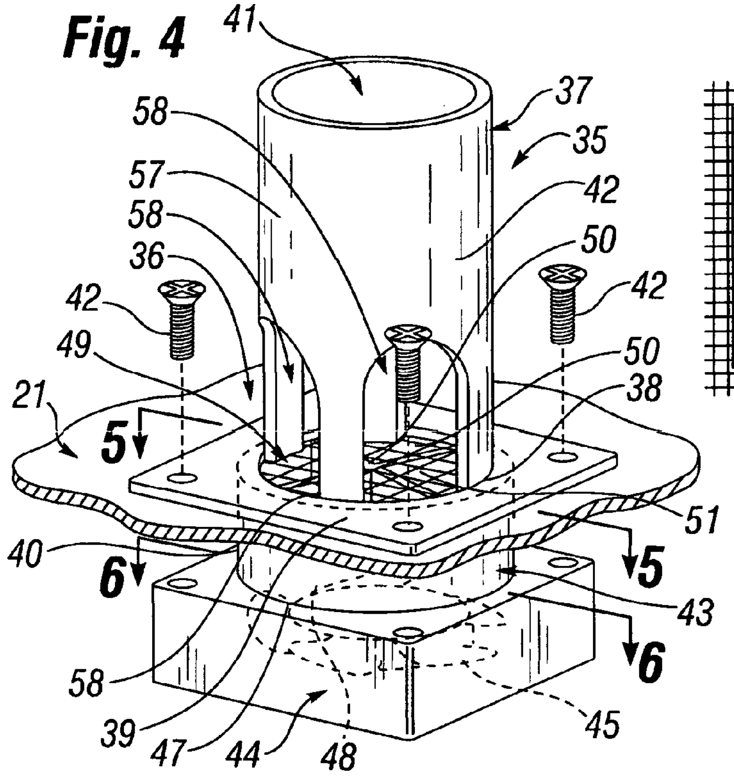

Solid Color Streams to Droplets Max Brightness –There are 7 Steps ( Low = LED ON )
( High = LED OFF )

Time in Milliseconds

Pulse Width LOW = 15.41ms Duty Cycle = 19.41ms Frequency = 51.52 HZ

Solid Color Streams to Drople ( PWM Train Waveform ) 10 to 1 Scale

Time in Seconds

RECIRCULATING LEVITATED BEADS FOUNTAIN DISPLAY APPARATUS

Recirculating levitated beads foundtain display apparatus this application is a continuation-in-part of application Ser. No. 11/825,778 filed on Jul. 9, 2007 now U.S. Pat. No. 7,963,057

BACKGROUND OF THE INVENTION

A. Field of the Invention

The present invention relates to visual display devices of the type which are intended to provide entertaining aesthetic effects, or for use in advertising to attract attention to products and venues in the vicinity of the display device. More particularly, the invention relates to a display apparatus which propels millimeter-size, lightweight plastic beads into the air in symmetric curved trajectories which simulate the motions of water droplets in water fountains, the height of the trajectories being variable in a wide variety of programmable and/or sound activated geometric arrangements and patterns; the airborne beads are optionally illuminated with lights of programmable colors, intensities and sequences to create a light show.

B. Description of Background Art

There have been disclosed display devices which propel small particles or beads into upwardly directed paths above a base to produce an attention attracting visual display. For example, Watkins, U.S. Pat. No. 4,757,625 discloses a display device for recirculating phosphorescent beads through a transparent tube or hollow sphere, the latter version having cascaded funnel-shaped collector rings which terminate in a single inlet tube to the fan enclosure.

Sena et al., U.S. Pat. No. 6,550,169 discloses a novelty display device which uses the blades of a motor-driven fan to propel polystyrene particles upwards through a vertical tube which has at the upper end thereof an elbow that directs a horizontal stream of particles entrained in an air stream over an upper horizontally disposed, perforated baffle plate. Particles fall through the perforations and progress downwardly through various visual elements such as miniature tree models located behind a transparent window of the device. The particles land on top of a catch basin which has the shape of a hollow ramp which slopes laterally upwards from an air inlet opening to an enclosure for the fan. The particles either slide down the upper surface of the catch-basin ramp, or fall through perforations in the upper surface of the ramp, and are drawn into fan enclosure inlet opening.

Sharp, U.S. Pat. No. 4,215,500 discloses a transparent column which encloses between upper and lower perforated screens thereof a quantity of polystyrene beads levitated by an upwardly directed air stream produced by an electric motor-driven blower fan located in a base of the device below the lower screen.

None of the foregoing prior art references discloses or suggests a visual display apparatus which is capable of producing visual effects that simulate the appearance of water fountain jets that can be rhythmically varied in height to produce "dancing waters" visual effects. The present invention was conceived to provide a recirculating levitated beads, fountain-type display which simulates the appearance of multiple water fountains, the height and illumination of which are varied in time under program control and/or ambient sound levels.

OBJECTS OF THE INVENTION

An object of the present invention is to provide a recirculating levitated beads fountain display apparatus in which lightweight beads such as millimeter size spheres made of a low density material such as expanded polystyrene or other plastic are propelled into upwardly directed, arc-shaped trajectories which simulate in appearance the paths of water droplets in a vertically upwardly directed water fountain.

Another object of the invention is to provide a display apparatus which utilizes at least one bead discharge nozzle that has at the base thereof a plurality of venturi inlet ports for drawing in beads from circumferentially spaced apart locations.

Another object of the invention is to provide a display apparatus which utilizes at least one bead discharge nozzle that has directed into a lower entrance bore thereof a pressurized flowing airstream which produces an upwardly directed air stream that is sufficiently free of rotational components or vortices so as to propel beads admitted into the nozzle in relatively curl-free arcs, thus simulating in appearance the paths of water droplets propelled from a vertically upwardly directed water fountain jet.

Another object of the invention is to provide a recirculating levitated beads display apparatus which has at least one vertical bead discharge nozzle that utilizes pressurized flowing air to propel beads upwardly from a base platform, the nozzle having inlet apertures for drawing in and recirculating beads which have been propelled upwardly and fallen back down onto the upper surface of the platform.

Another object of the invention is to provide a display apparatus which utilizes a vertical nozzle having a screened lower entrance bore supplied with pressurized flowing air that is relatively free of any circumferential directed components, thereby discharging beads admitted into the nozzle in diverging arc-shaped trajectories which are relatively uniformly distributed over various azimuth angles relative to the vertical longitudinal axis of the nozzle.

Another object of the invention is to provide a recirculating levitated beads display apparatus which utilizes a vertical nozzle supplied with pressurized air to cyclically propel lightweight plastic beads into curl-free, upwardly directed arc-shaped trajectories, the nozzle having circumferentially spaced apart notches which extend upwardly into an outer vertical wall surface of the nozzle from its base, the notches being effective in receiving beads which fall onto a supporting platform for the nozzle from arbitrary azimuth angles relative to the vertical longitudinal axis of the nozzle.

Another object of the invention is to provide a display apparatus which has at least one bead discharge nozzle that includes a rotary motor driven fan, a flow-straightener duct axially aligned with the discharge side of the fan, a cruciform baffle longitudinally disposed within the base of the duct, for minimizing rotational or curl components of flowing air supplied by the fan, a perforated bead-blocking screen positioned transversely above the outlet orifice of the duct, and a tubular bead discharge nozzle mounted on the upper surface of the screen in coaxial alignment with the duct.

Another object of the invention is to provide levitated bead display apparatus which includes at least one vertical bead discharge nozzle, and a plurality of illumination fixtures for illuminating beads propelled upwardly from the nozzle, each illumination fixture including a tubular enclosure arranged around an electrical lamp, the tubular enclosure having an obliquely angled upper end face to which is fastened a bead-blocking screen.

Another object of the invention is to provide a recirculating levitated beads display apparatus which utilizes an electrically powered blower that supplies pressurized flowing air to a program controlled, motor driven valve to vary air pressure and flow rate of air supplied to a bead discharge nozzle, thereby enabling the height of bead discharge patterns to be varied under program control.

Another object of the invention is to provide a recirculating levitated beads display apparatus which includes at least two bead discharge nozzles supplied with flowing air from a blower box and manifold, the air flow rate to each nozzle being separately controllable by a separate motor-driven ball valve which maintains a constant back pressure on the inlet port of the manifold thus ensuring that operation of a valve to vary air flow in a selected nozzle has no effect on air flow of other nozzles.

Another object of the invention is to provide a recirculating levitated beads display apparatus which utilizes a plurality of horizontally spaced apart vertical bead discharge nozzles each having circumferentially spaced apart bead return inlet notches extending into the vertical wall of the nozzle from the base of the nozzle, and a plurality of illumination fixtures arranged around the nozzles.

Another object of the invention is to provide a recirculating levitated bead display apparatus which includes a plurality of vertical bead discharge nozzles each having bead return inlet paths cut upwardly from the horizontal base thereof, each nozzle having an air flow discharge rate which is controllable by a motor-driven valve in response to a computer program control and/or ambient sounds such as music, and a plurality of illumination sources for illuminating levitated beads with light of different color patterns and intensities which are also controllable by a computer program and/or ambient sounds, thereby creating a light-show effect.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferrable from the description contained herein be included within the scope of the invention as defined by the appended claims.

SUMMARY OF THE INVENTION

Briefly stated, the present invention comprehends a display apparatus which uses pressurized flowing air supplied by an electrically driven fan or blower to propel small, lightweight polystyrene beads vertically upwards into the air from tubular nozzles. The nozzles protrude upwardly through a horizontal base or platform which extends sufficiently far from the nozzles to receive beads which fall from the upper limits of their trajectories. Also, the nozzles are specially designed and constructed so that air flow from the nozzles is relatively free of curl and vortices. Thus, the beads are discharged upwardly from the nozzles in parallel paths which diverge at upper limits thereof into trajectories which simulate the flow of water droplets in a water fountain jet. In a basic embodiment, vortex-free air discharge from a nozzle is effected by an airflow straightener duct located between a rotary fan and the inlet bore of a bead discharge nozzle tube, the straightener duct including a short circular cross-section tube in which is longitudinally disposed a pair of perpendicular plates that intersect on the longitudinal axis of the tube, thus having in end view the shape of a cruciform baffle.

Also in the basic embodiment, each bead discharge nozzle includes a circular cross-section nozzle tube which is coaxially aligned with and seated on the upper outlet aperture of the flow straightener duct. The nozzle discharge tube has cut vertically upwards from the lower transverse annular wall surface thereof a plurality of notches which serve as inlet ports for recirculating beads which have fallen onto the upper surface of the platform. Preferably, four notches spaced circumferentially apart at equal intervals are provided. Also, each notch preferably has a laterally symmetrical shape, including an arch-shaped, arcuately curved upper edge wall. A perforated screen having a smaller mesh size than the beads, i.e., 2 mm for 3 mm to 5 mm diameter beads is positioned between the discharge nozzle and flow straightener duct, thus preventing beads from dropping into the duct.

Because of the relatively uniform azimuthal distribution of falling beads around the vertically disposed longitudinal axis of a nozzle, and the azimuthally symmetric arrangement of bead inlet ports, the display apparatus according to the present invention is operable in a free-standing mode, in which beads are continuously re-circulated without being confined within an enclosure. Preferably, however, a flexible fabric mesh screen or other non-rigid perimeter barrier is positioned around the perimeter of the platform, to restrain the statistically small numbers of beads which might be propelled or carried by strong wind currents to large horizontal distances away from a bead discharge nozzle.

Preferred embodiments of a re-circulating bead fountain display apparatus according to the present invention include at least one and preferably several illumination sources which are effective in illuminating beads that are in flight between the bead discharge nozzle and a base on which the nozzle is mounted, thus incorporating a "light-show" characteristic into the apparatus. Each illumination source includes an electrical lamp contained within a tubular shroud, and a light transmissive screen which closes off the upper end of the shroud, to prevent falling beads from entering the shroud. In preferred embodiments, the illumination source shroud has a generally cylindrical shape, and an annular-shaped upper transverse wall which is obliquely angled with respect to the longitudinal axis of the shroud, and symmetrically aligned with respect to a radius vector between the shroud and a bead discharge nozzle. Preferably, the bead-blocking screen affixed to the upper transverse end of the illumination source shroud is a perforated screen, of smaller mesh size than the bead diameter, thus permitting air flow to enable convective cooling of an electrical lamp within the illuminator shroud.

Preferred embodiments of a levitated beads fountain display apparatus according to the present invention include a mechanism for varying the intensity and color of light emitted from the illumination source onto airborne beads. In preferred embodiments, a plurality of illumination sources are provided which include electrically powered lamps. The various lamps have different colors, or the illumination sources are provided with different colored filters, so that air borne beads may be illuminated with different colored lights. In preferred embodiments, the intensity, geometric pattern and sequence of electrical energization of the illumination source lamps are varied by an electronic control system. The latter optionally utilizes electronic circuitry which includes a microphone and amplifier to vary electrical current supplied to the illumination source lamps in response to ambient sound levels, such as music in the vicinity of the apparatus. Optionally, a display apparatus according to the present invention includes programmable electronic circuitry such as a micro processorbased computer which produces illumination sequences that are pre-programmed, sound responsive, or a combination of both.

A display apparatus according to the present invention optionally includes a mechanism for cyclically varying the height of at least one bead discharge fountain, preferably by varying the air flow rate to a selected bead discharge nozzle. Height variation sequences are preferably sound and/or program responsive in a manner similar to the variable illumination sequences described above, and using the same or similar control circuitry.

In a preferred embodiment, air flow rate to selected nozzles is varied by an electrically operated valve, such as a stepper motor operated valve, in response to programmed command sequences and/or ambient sound levels. In a most preferred embodiment, in which two or more bead discharge nozzles have valve-controllable air flow rates, a novel valve arrangement is used in which the air flow rate of individual bead discharge nozzles, and hence the height of individual bead fountains, is individually variable without any "cross-talk" effects which would result in undesired variations in the heights of non-selected bead fountains.

A novel valve control arrangement according to the present invention includes a blower box, and an outlet manifold which has outlet tubes connected to the input ports of separate control valves. Each control valve is of novel design and includes a T-shaped tubular body which has a longitudinally elongated main tube, and a short side arm air inlet tube which protrudes radially outwards from the main tube, midway between opposite transverse ends of the main tube. The bore of the side arm tube is of the same diameter as the main tube bore which it communicates with. A ball slidably contained with the main tube bore is reciprocally movable within the bore by means of an elongated push rod which is attached at one end to the ball and which protrudes longitudinally outwardly from the main tube bore through a rear, exhaust port opening of the main tube. The outer end of the push rod is pivotably attached to a crank arm eccentrically attached to a drive wheel fastened to a shaft of a stepper motor. When the stepper motor is operated to retract the push rod to its maximum withdrawn outer position relative to the main valve tube, the ball is displaced rearwards from the bore of the side air inlet tube. This construction allows maximum air flow from the side air inlet port bore to the front outlet bore of main tube of the valve, thus allowing maximum air flow to a bead discharge nozzle connected through an air supply hose to the air outlet port at the front end of the main valve tube.

Conversely, when the stepper motor is operated to extend the ball push rod to its maximum innermost position within the main tube bore of the valve past the side air inlet tube bore, the ball completely obstructs air flow to the outlet port of the valve, thus resulting in zero air flow to the selected bead discharge nozzle. In this case, all the air input to the side air inlet tube of the valve is expelled through the rear exhaust port of the main valve tube. For intermediate stepper motor positions, the valve ball is partially aligned with the inlet port tube bore, thus allowing variable air flow rates from the air inlet tube to the outlet port. Importantly, for whatever position of the ball with the valve body, back pressure on the air inlet port is the same, with all of the inlet air flowing out of the front outlet port with the ball fully retracted, and all of the air being expelled from the rear exhaust port of the valve with the ball extended fully forward. This construction enables the air flow rate to each of a plurality of bead discharge nozzles to be individually and independently varied, with no undesirable cross-talk effects, i.e., varying air flow rate to an unselected nozzle.

BRIEF DESCRIPTION OF THE DRAWINGS

FIG. 3 is a lower plan view of the apparatus of FIG. 1.

FIG. 4 is a fragmentary perspective view of the apparatus of FIG. 1, on an enlarged scale, showing a bead discharge nozzle, motor-driven fan, and flow straightener duct of the apparatus.

FIG. 5 is a transverse sectional view of the flow straightener duct of FIG. 4, taken in the direction of line 5-5.

DESCRIPTION OF THE PREFERRED EMBODIMENTS

FIGS. 1-28 illustrate various aspects of a recirculating levitated beads fountain display apparatus according to the present invention. More specifically FIGS. 1-9 and 17 illustrate a basic embodiment of the apparatus which has a single bead discharge nozzle, while FIGS. 10-16 and 18 illustrate an embodiment which has three bead discharge nozzles. FIGS. 19-28 illustrate modifications of the apparatus shown in FIGS. 1 and 2.

Figure 1:
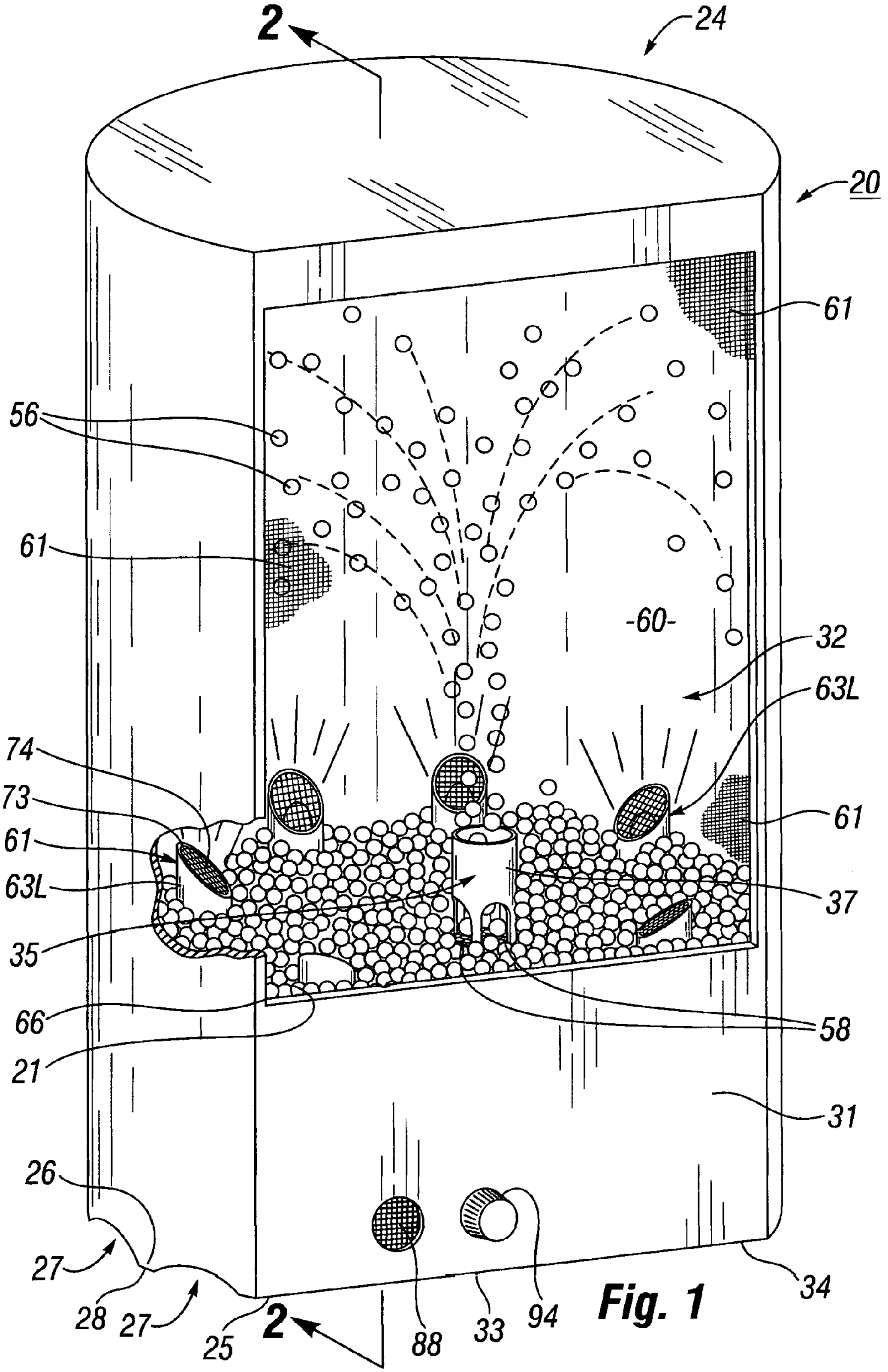
FIG. 1 is a perspective view of a basic, single bead discharge nozzle embodiment of a recirculating levitated beads fountain display apparatus according to the present invention.
Figure 2:
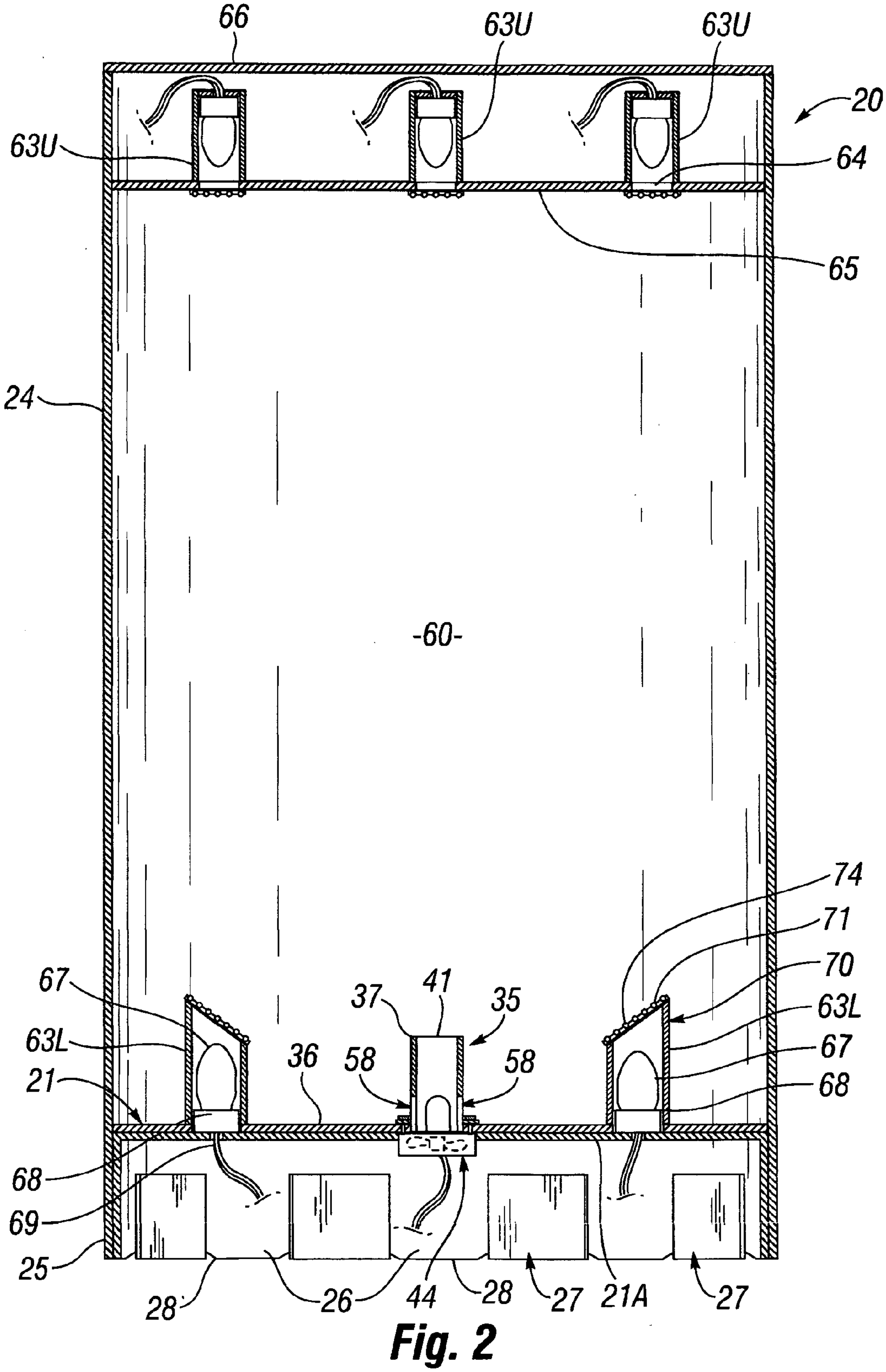
FIG. 2 is a vertical longitudinal sectional view of the apparatus of FIG. 1.

Referring first to FIGS. 1-3, a recirculating levitated beads fountain display apparatus 20 according to the present invention may be seen to include a flat, horizontally disposed platform 21 made of a thin, uniform thickness sheet composed of a rigid material such as thin gauge metal, plastic, fiberboard or the like. As will be made clear in the ensuing description, the platform 21 may have any desired outline shape, as long as the platform has an area sufficiently large to collect beads which fall from various positions around a bead discharge nozzle 35. In the embodiment 20 shown in FIGS. 1-3, the outline shape of platform 21 approximates that of a 270° sector of a circle truncated by a front chord edge 22 to form a laterally symmetric plate which has an arcuately curved, convex rear surface 23.

As may be seen best by referring to FIGS. 2 and 3, platform 21 fits conformally within a uniform transverse horizontal cross-section, generally semi-cylindrically-shaped enclosure housing 24, which has an internal cross-section that approximates the external cross-section of the platform. As shown in FIGS. 2 and 3, platform 21 is supported by a flat-topped table 21*a* which has a transverse cross-sectional shape congruent with that of the platform. Table 21*a* has vertically downwardly disposed rear legs 26 which support platform 21*a* short distance above the curved lower transverse horizontal edge wall 25 of housing 24 which defines the base of the apparatus. Legs 26 have a rectangular shape and are circumferentially spaced apart and located adjacent to the curved rear inner face 24A of housing 24. Lower edge wall 25 has formed therein, between legs 26, a plurality of air intake notches 27. The legs have lower horizontal edges 28 coplanar with lower edge wall 25 of the housing. Platform support table 21*a* has attached to a lower surface thereof a rectangularly-shaped electronic circuitry enclosure box 29, which has a lower edge wall 30. Electronic circuitry enclosure box 29 is located directly behind a vertically disposed front laterally elongated, rectangularly-shaped front cover panel 31 which covers approximately the lower one-quarter of a rectangular front opening 32 of housing 24. Lower horizontal edge wall 33 of front cover panel 31 is coplanar with lower edge wall 25 of tube 24, and cooperates therewith to form the base edge wall 34 of apparatus 20.

Referring to FIGS. 1-3, it may be seen that display apparatus 20 includes a bead discharge nozzle 35 which protrudes perpendicularly upwards from the center of upper surface 36 of platform 21. As may be understood by referring to FIG. 1, the function of bead discharge nozzle 35 is to ingest beads 56, and propel the beads vertically upwards from platform 21, in curved trajectories which simulate the paths of water droplets in a water fountain. The novel design and construction of apparatus 20, and in particular nozzle 35, may be best understood by referring to FIGS. 2-5 in addition to FIG. 1.

As shown in FIG. 4, nozzle 35 includes a vertically elongated, hollow circular cross-section cylindrical nozzle tube 37. Nozzle tube 37 has a lower horizontally disposed transverse annular ring-shaped end wall 38 which is secured to the upper surface of a flat, square base plate 39. As shown in FIG. 4, square base plate 39 has through its thickness dimension a concentric circular aperture 40 which is of approximately the same size as a central coaxial bore 41 disposed longitudinally through nozzle tube 37. Nozzle tube 37 is fixed to base plate 39 with bore 41 of the nozzle tube aligned with aperture 40 through the base plate by any suitable expedient, such as an adhesive bond.

As shown in FIG. 4, base plate 39 of nozzle 35 is fastened to the upper surface 36 of platform 21, by suitable means, such as screws 42.

Referring still to FIG. 4, it may be seen that nozzle 35 includes a duct 43 which is disposed longitudinally downwards from aperture 40 of base plate 39, to the outlet port of a rotary box fan 44, which has a rotor 45 that is rotatably driven by an electric motor 46.

Preferably, duct 43 is specially constructed so as to minimize in an airstream flowing out from an upper outlet opening 49 of the duct, circumferential air movements, curl, eddies or vortices introduced by fan rotor 45 into air flow conducted into the lower entrance opening 47 to bore 48 through the duct. This flow straightening construction is used is because the present inventor has found that transversely or circumferentially oriented, i.e., non-axial, air flow components within bore 41 through nozzle tube 37 result in corresponding transverse or circumferentially directed moments to be imparted to beads discharged from the nozzle, thus resulting in an undesirably shaped, swirling flow pattern which does not resemble flowing water droplets.

The present inventor has found that an effective construction which promotes axial air flow through duct 43, while minimizing transversely or circumferentially directed airstream components, employs thin longitudinally disposed plates within bore 48 through duct 43. Thus, as shown in FIGS. 4 and 5, duct 43 is preferably constructed as a flow straightener or axial flow promoting duct, by positioning with the bore 48 of the duct a pair of thin, rectangularly-shaped baffle plates 50, 51. Plates 50, 51 are disposed through the entire length of duct 43, and intersect perpendicularly at the longitudinal center line of bore 48 through duct 43 to thus comprise a flow straightener structure 52 which has in transverse or end views a cruciform shape.

Referring still to FIGS. 4 and 5, it may be seen that bead discharge nozzle 35 includes a transversely disposed, perforated nozzle screen 53 which is located between the bore exit opening 49 of straightener duct 43 and the lower entrance opening to bore 41 of nozzle tube 37. The purpose of nozzle screen 53 is to prevent beads 56 (see FIG. 1) from entering flow straightener duct 43. Thus, the mesh size of nozzle screen 53 is chosen to be smaller than the diameter of beads 56, i.e., 2 mm for 3 mm or 5 mm diameter beads.

Beads 56 preferably have a spherical shape and are made from a lightweight, impact resistance material, which has a density of less than 1 gm/cm$^3$. In an example embodiment of apparatus 20, expanded polystyrene beads in the form of spheres having an average diameter of 4 mm, a diameter range of 3 mm-5 mm, and a density of about 0.016 to 0.022 gm/cm$^3$ were found to provide satisfactory performance of the apparatus.

Referring to FIGS. 1, 2 and 4, it may be seen that bead discharge nozzle tube 37 of bead discharge nozzle 35 has cut through a lower portion of the cylindrical wall 57 thereof a plurality of entrance openings 58 for ingesting beads 56 into a stream of air produced by fan 45 and directed upwardly into bore 41 of the nozzle tube. In a preferred embodiment, a plurality of at least three and preferably four entrance openings 58 spaced circumferentially equidistant from one another, are provided through cylindrical wall 57 of bead discharge nozzle tube 37. Also, the present inventor has determined experimentally that it is desirable to have bead entrance openings 58 penetrate lower annular transverse end wall 38 of bead discharge nozzle tube 37, to prevent obstructing ingress of beads 56 through the entrance openings into bore 41 of the nozzle tube. In an example embodiment of apparatus 20 shown in FIGS. 1, 2 and 4, bead entrance openings 58 of bead discharge nozzle tube 37 consisted of four identically shaped, laterally symmetric, arch-shaped notches which extend upwardly from annular base 38 of the nozzle tube into wall 57 of the nozzle tube.

FIG. 1 illustrates the paths of beads 56 during operation of apparatus 20. As shown in FIG. 1, those beads 56 on the upper surface 36 of platform 21 which are sufficiently close to bead entrance openings 58 in the cylindrical wall of nozzle tube 37 of bead discharge nozzle 35 are drawn into central longitudinally disposed bore 41 of the nozzle tube. Initially, before electrical power is applied to motor 46 of fan 44, a sufficient quantity of beads 56 is loaded onto platform 21, to a depth sufficient for an appreciable number of beads 56 to roll under the force of gravity through entrance openings 58 into the bore 41 of bead discharge nozzle 37. Then, when an upwardly directed axial flow of air through nozzle tube 37 is produced as a result of applying electrical power to fan motor 46, a venturi effect produces a pressure reduction within bore 41 near openings 58. This pressure reduction constitutes a partial vacuum which draws beads 56 through openings 58 into bore 41, enabling a re-circulation of beads which had been previously propelled upwardly from the nozzle into the interior space 60 of housing 24, above platform 21, and dropped back down onto platform 21.

As indicated schematically in FIG. 1, the axial air flow from nozzle discharge tube results in beads 56 being propelled upwardly into arc-shaped trajectories which diverge from the vertical center line of the nozzle tube. Because the air flow from nozzle tube 37 is constrained to be substantially axial, the trajectories of beads 56 are distributed relatively evenly in all directions from the longitudinal axis of the nozzle tube. For that reason, an apparatus employing the novel design and construction of nozzle 35 can take the form of an unenclosed platform. However, as a practical matter, for non-circular platforms as platform 21 in FIG. 1, and to restrain wind gusts from propelling beads 56 beyond the footprint of the platform, it is desirable to place some sort of barrier around the periphery of platform 21. Thus, as shown in FIG. 1, a barrier consisting of a very fine, small mesh fabric screen 61 is secured over the front opening 32 of housing 24. Preferably screen 61 is sufficiently dark, e.g., black, and diaphanous as to be nearly invisible.

The features of an example embodiment of a re-circulating levitated beads fountain display apparatus 20 thus far described, provides aesthetically pleasing visual effects. However, a preferred embodiment of the apparatus includes illumination sources for illuminating airborne beads 56 to provide enhanced visual effects, as will now be described.

Referring to FIGS. 1 and 2, it may be seen that apparatus 20 includes a plurality of illumination sources 63 for illuminating beads 56 which are made airborne by air flowing upwards from bead discharge nozzle 35. The number and location of illumination sources is a matter of ordinary design choice, selected generally to provide a desired level of illumination of airborne beads 56. The example embodiment of apparatus 20 shown in FIGS. 1 and 2 has six lower illumination sources 63L which protrude upwardly at circumferentially spaced apart locations around the bead discharge nozzles 35. As shown in FIG. 2, apparatus 20 also has upper illumination sources 63U which are mounted above apertures 64 through a false ceiling panel 65 located below and parallel to an upper horizontal cover panel 66 of enclosure 24. Upper illumination sources 63U are preferably located at circumferentially spaced apart locations around the vertical centerline of bead discharge nozzle 35.

As shown in FIGS. 2 and 3, each lower illumination source 63L includes an electric lamp 67 which is removably attached to a socket 68. Socket 68 and lamp 67 are provided with electrical power from electronic circuitry control box 29 via a two-conductor insulated power cord 69.

As shown in FIG. 2, each illumination source 63L includes tubular, hollow cylindrically-shaped shroud tube 70. Each illumination source 63L also includes a light transmissive shroud cover cap 71. Shroud cap 71 has a tubular body 72 which is coaxially aligned with shroud 70, and has an obliquely angled upper transverse annular ring-shaped end wall 73. A flat, light transmissive bead-blocking screen 74 is fastened conformally to upper end wall 73. Preferably, light transmissive bead-blocking screen 74 is made of a perforated material, such as a mesh screen which has openings 74A smaller than the diameter of beads 56, e.g., 2 mm openings for a bead diameter of 3 mm-5 mm. The purpose of openings 74A is to allow air warmed by electrical lamp 67 to escape through the openings, thus facilitating convective cooling of the lamp and interior space of shroud 70.

As may be understood by referring to FIG. 1, the sloping surface afforded by oblique angle of upper end wall 73 of shroud cap 71 prevents beads 56 from accumulating on screen 74. As may also be understood by referring to FIG. 1, the plane of upper annular wall 73 and screen 74 of shroud cap 71 is preferably oriented symmetrically with respect to a radius vector between the longitudinal axes of the shroud tube 70 and bead discharge nozzle tube 37. This orientation ensures that light emitted through shroud cap 71 is directed towards beads issuing from bead discharge nozzle tube 37.

As shown in FIG. 2, lamp socket 68 protrudes upwardly from the upper surface of platform support table 21*a* through an aperture disposed through platform 21. With this construction, platform support table 21*a* may be releasably retracted downwardly out of enclosure 20, thus allowing access to lamp sockets 67 for replacement of lamps 68.

Figures 6, 7, 9:
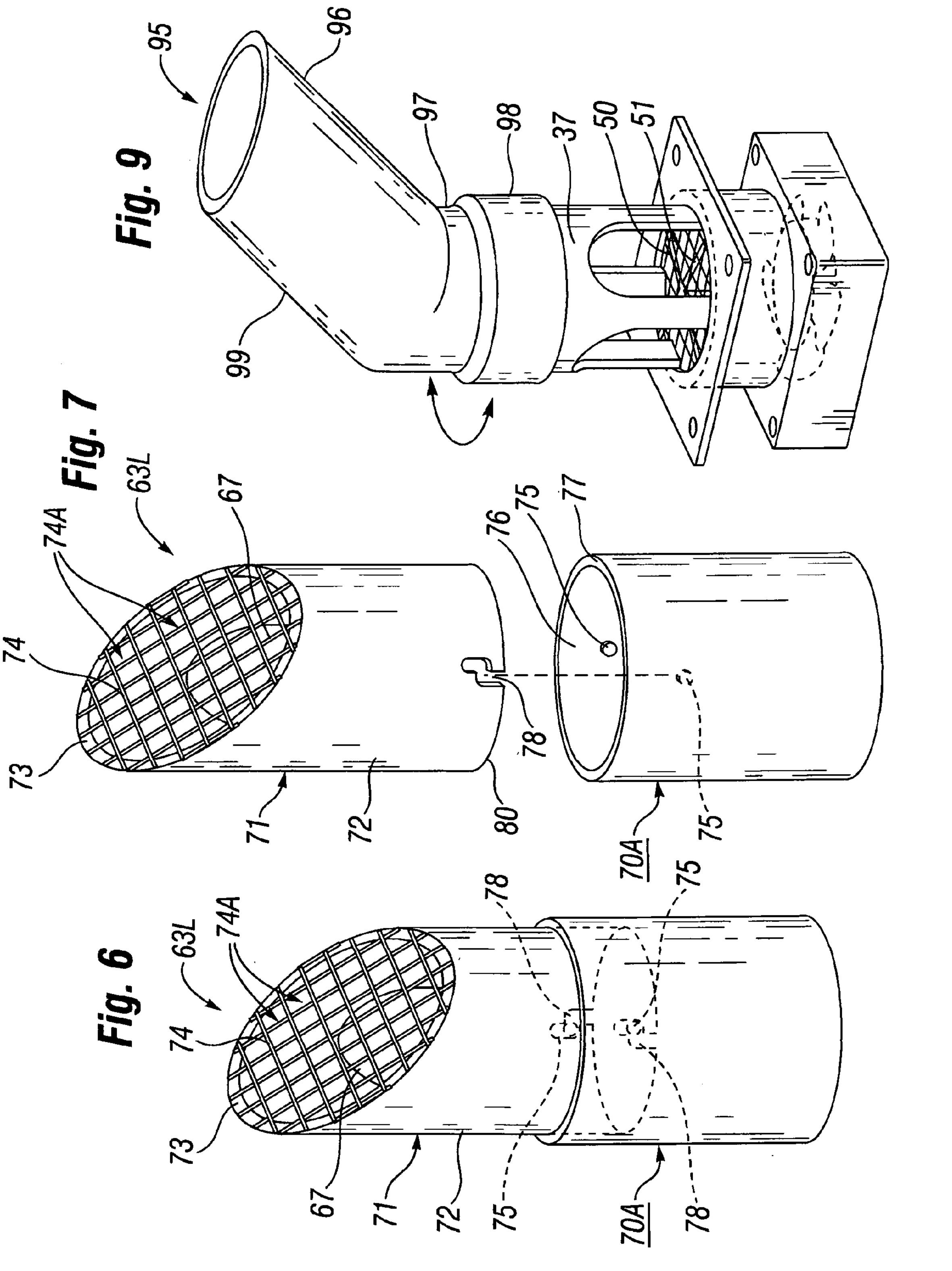
FIG. 6 is a fragmentary perspective view of a modified illumination source for use with the apparatus of FIG. 1 or FIG. 10.
FIG. 7 is an exploded view of the enclosure of FIG. 6.
FIG. 9 is a perspective view of a modified, adjustable discharge angle bead discharge nozzle for the apparatus of FIG. 1.

As may be seen best by referring to FIGS. 6 and 7, a modified shroud cap 71*a* is preferably constructed so as to be readily removable from and replaceable on shroud tube 70*a*, to facilitate replacing lamp 67 from the upper side of platform 21. Thus, as shown in FIGS. 6 and 7, shroud tube 70*a* has a pair of bayonet pins 75 which protrude radially inwards from diametrically opposed sides of inner cylindrical wall surface 76 of the shroud tube, a short distance below upper transverse annular end wall 77 of the shroud tube. Pins 75 are alignable with and engageable by a pair of diametrically opposed bayonet slots 78 or keyways which are cut upwardly through the lower transverse annular wall surface 80 of shroud cap 71, which has an outer diameter slightly less than the inner diameter of the shroud tube. This construction enables shroud cap

71 to be telescopically received in and removed from the bore of shroud tube 70*a*, and kicked or unlocked therefrom by twisting the shroud cap to engage or disengage bayonet pins 75 from bayonet slots 76.

As may be seen best by referring to FIG. 2, upper illumination sources 63U are substantially similar in construction to lower illumination sources 63L, except that the lower transverse end wall 73U of upper shroud end cap 71U may be perpendicular to the longitudinal axis of the shroud tube 70U, rather than obliquely angled.

Figure 8:
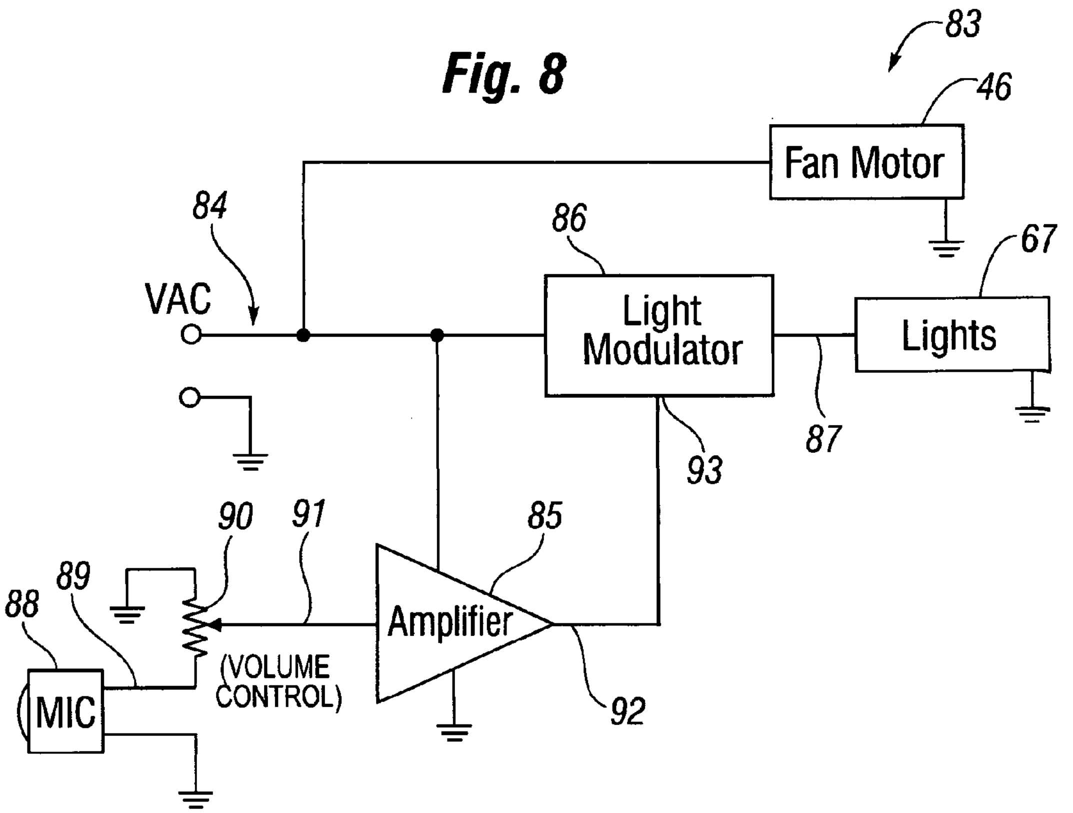
FIG. 8 is an electrical block diagram of electronic control circuitry for the apparatus of FIG. 1.

FIG. 8 is an electrical block diagram of the electronic control circuitry of display apparatus of FIGS. 1-3. As shown in FIG. 8, electronic control circuitry 83 includes a two conductor power input cord 84 for connection to a voltage-reducing adapter (not shown) pluggable into an A.C. power receptacle. Electrical power input to control circuitry 83 via power input cord 84 powers electric fan motor 46, an electronic amplifier 85, a light modulator 86 and electric lamps 67L, 67U in lower and upper illumination sources 63L, 63U, via lamp cords 69.

As shown in FIG. 8, apparatus 20 preferably includes a microphone 88 which has an output terminal 89 on which electrical signals are produced in response to ambient sounds such as music within reception range of the microphone. Electrical signals proportional to sounds received by microphone 88 are coupled from microphone output terminal 89 through a potentiometer 90 to an input terminal 91 of electronic amplifier 85. Amplifier 85 has an output terminal 92 which is connected to the input terminal 93 of light modulator 86. As those skilled in the art will recognize, the circuitry 83 as thus described enables electrical current in lamps 67 to be varied in response to sounds received by microphone 88, at sound amplitude levels adjustable by moving knob 94 on potentiometer 90 to a desired position. Thus, the intensity of lights produced by lamps 67 and emitted from lower and upper illumination sources 63L, 63U onto airborne beads 56 can be varied rhythmically in response to sounds received by microphone 88, at adjustable intensity levels controllable by potentiometer 90.

Figures 17, 18:
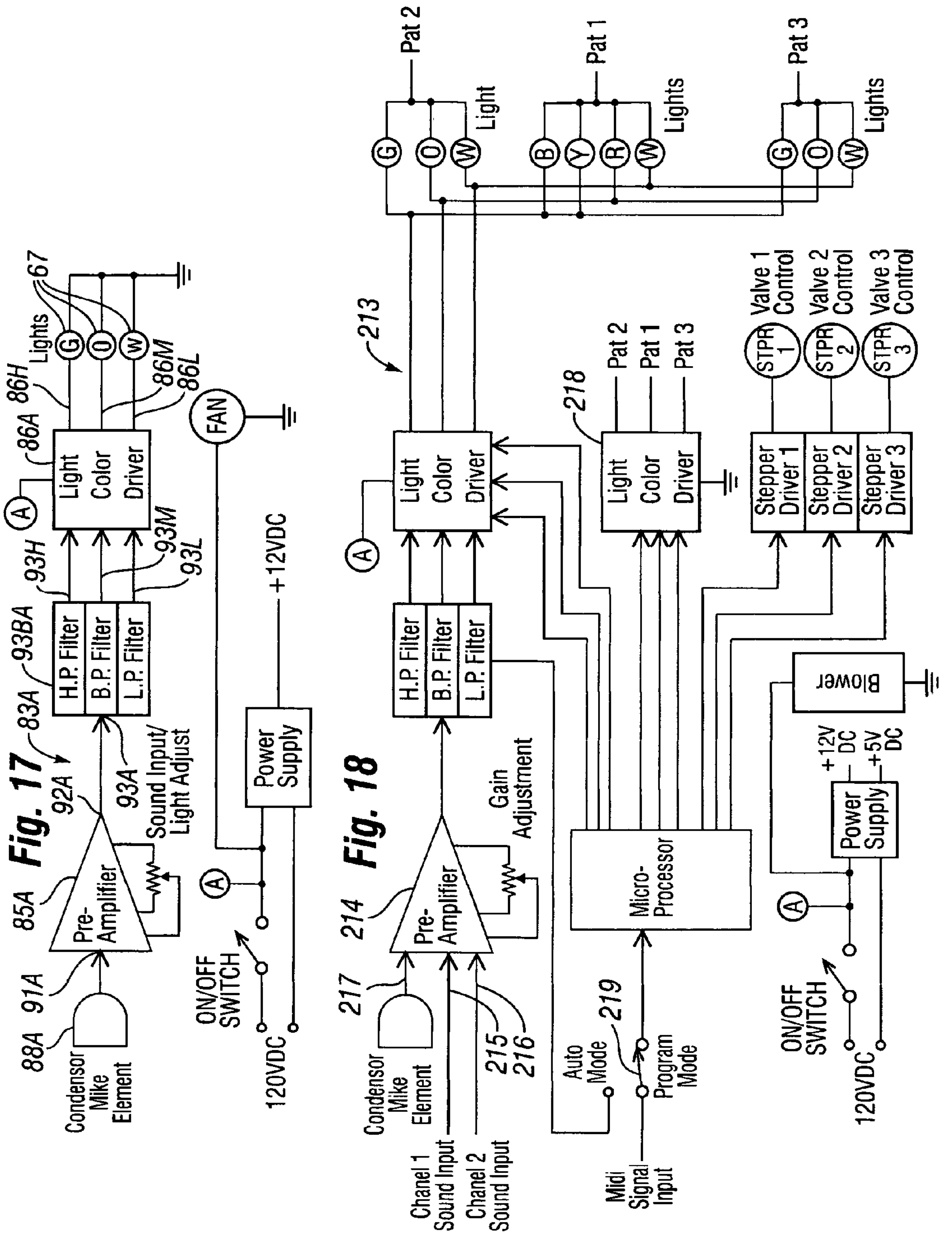
FIG. 17 is an electrical block diagram of a modification of the control circuitry shown in FIG. 8 for the apparatus of FIG. 1.
FIG. 18 is a block diagram of a modification of electronic control circuitry for the apparatus of FIGS. 10 and 11.

FIG. 17 illustrates a modification of electronic control circuitry 83 for the beads fountain display apparatus of FIGS. 1-3. Modified control circuitry 83A includes a microphone 88A which has an output terminal connected to an input terminal 91A of an electronic pre-amplifier 85A. Amplifier 85A has an output terminal 92A which is connected to the input terminal 93A of a multi-band electronic wave filter 93B. Electronic wave filter 93B has a high-pass filter section, a band pass filter section and a low-pass filter section which separate amplified multi-frequency audio signals on input terminal 93A of the multi-band filter into high-frequency, mid-frequency and low-frequency signals, respectively. The latter appear at output terminals 93H, 93M, 93L, respectively of the multi-band filter 93B, and are input to three separate modulation sections of a light modulator 86A. The latter has three separate lamp driver output terminals 86H, 86M, 86L which are connected to different colored lamps 67 of illumination sources 63, such as green, orange and white lamps indicated in FIG. 17.

FIG. 9 illustrates a modification 95 of bead discharge nozzle 35 shown in FIG. 4. Modified bead discharge nozzle 95 includes an obliquely angled tubular extension 96. Extension 96 has a lower straight hollow tubular body 97 which has an inner bore diameter and outer wall diameter approximately the same size as those of bead discharge nozzle tube 37. Body 97 of extension 96 has at the lower end thereof a larger diameter tubular flange 98 which has an inner diameter slightly larger than the outer diameter of bead discharge nozzle tube 37. Tubular flange 98 of tubular extension 96 is adapted to fit onto the upper end of nozzle discharge tube 37 sufficiently tightly to retain the nozzle extension in place on the nozzle discharge tube, but sufficiently loosely to enable the nozzle extension to be rotatable to any desired azimuth angle relative to the nozzle discharge tube. This arrangement enables a tubular leg 99 which extends obliquely upwardly from short lower tubular body 97 of nozzle extension 96 to be adjusted to any desired azimuth angle, thereby enabling beads 56 to be discharged at any desired azimuth angle relative to the longitudinal centerline of bead discharge nozzle tube 37.

Figure 16:
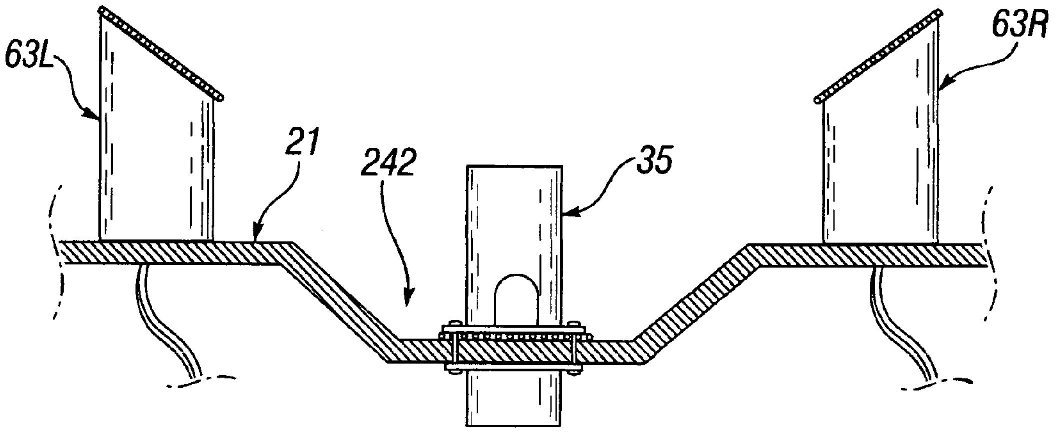
FIG. 16 is a fragmentary, partly sectional view of a second modification of the apparatus of FIG. 10, comprising a conical cross-section bead reservoir.

FIGS. 16-18 illustrate another embodiment 120 of a recirculating levitated beads fountain display apparatus according to the present invention, which has multiple bead discharge nozzles.

As shown in FIGS. 10-16 and 18, apparatus 120 includes a platform 121 which supports three bead discharge nozzles 135, which protrude upwardly from the upper surface of the platform. Platform 121 has an elongated arcuately curved outline shape including left and right generally circularly-shaped ends 121L, 121R of the same size spaced equidistant from a generally circularly-shaped middle section 121M which has a larger diameter than the end sections. The centers of each of the three sections of platform 121 lie on a straight longitudinal axis. Bead discharge nozzles 135 include left and right nozzles 135L, 135R which are located at the center of left platform sections 121L, 121R, respectively, and a middle bead discharge nozzle 135M, located in the center of middle platform section 121M, i.e., midway between the left and right nozzles. Each nozzle 135L, 135R, 135M has a design and construction substantially similar to that of nozzle 35 described above, and may be provided with flowing air from individual fans 44 as shown in FIG. 4. However, in embodiments of a multiple bead discharge nozzle apparatus 120 which utilize a pressurized air source such as a compressor or blower which produces an air flow to the bead discharge nozzles which is substantially free of non-axial air flow components, a flow straightener duct such as duct 43 may be dispensed with.

Figure 10:
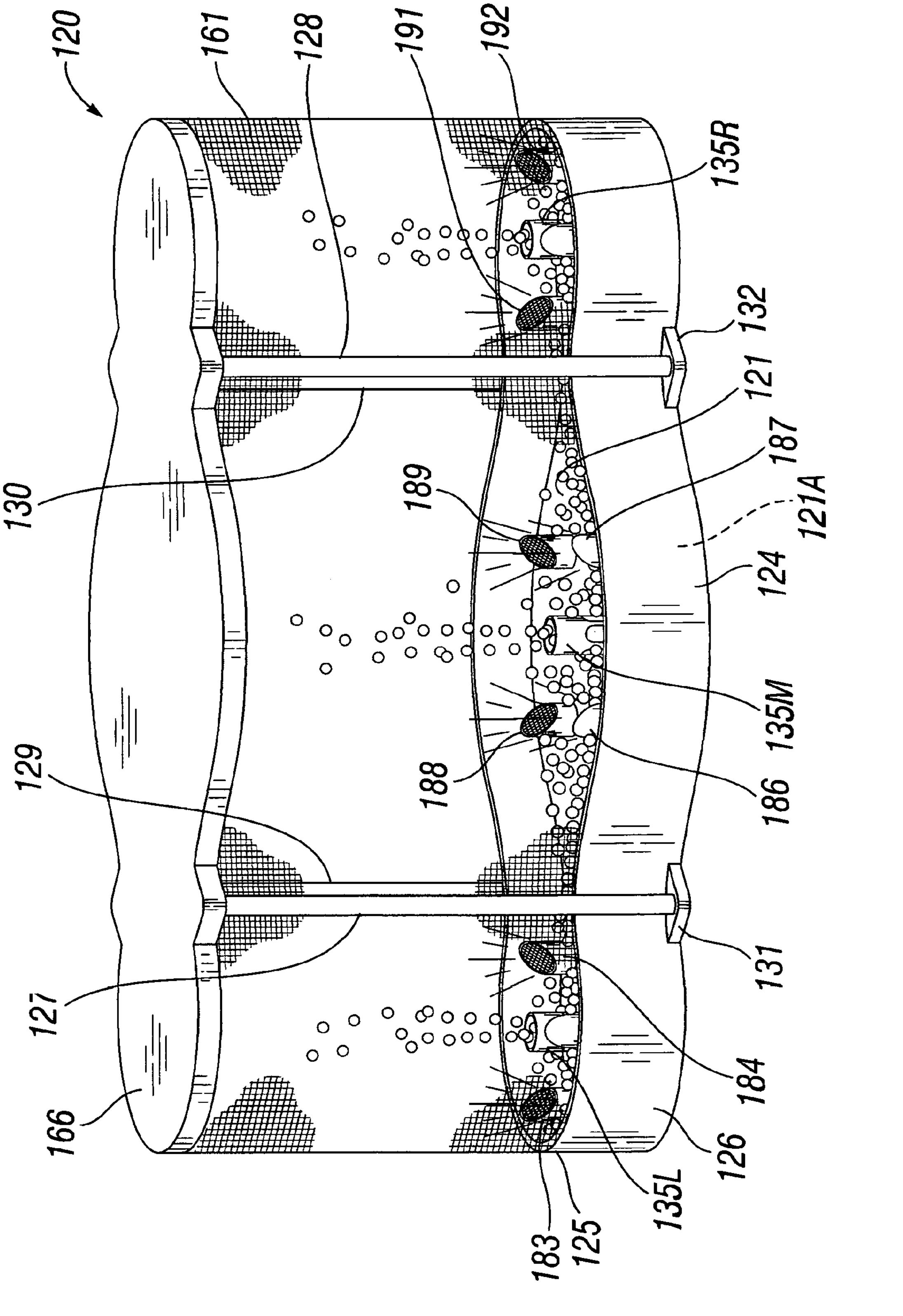
FIG. 10 is a front perspective view of another embodiment of a display apparatus according to the present invention, which has three bead discharge nozzles.
Figure 12:
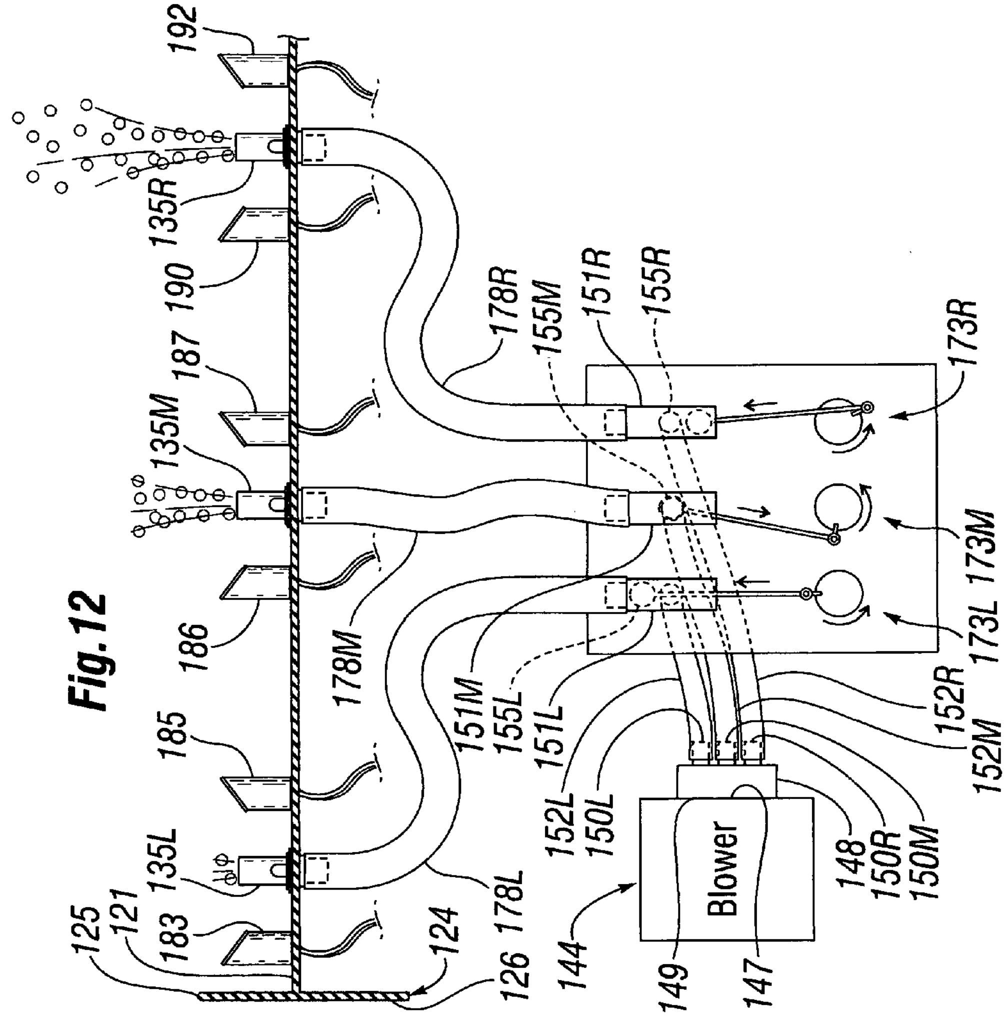
FIG. 12 is a fragmentary partly schematic front elevation view of the apparatus of FIG. 10.

As shown in FIGS. 10 and 12, apparatus 120 includes a support base 124 for platform 121, which may consist of a flange wall 126 that protrudes perpendicularly downwardly from curved peripheral edge 125 of platform 121, thus forming a hollow interior space 121A below platform 121 and a table top or other support surface on which the apparatus is placed.

Figure 11:
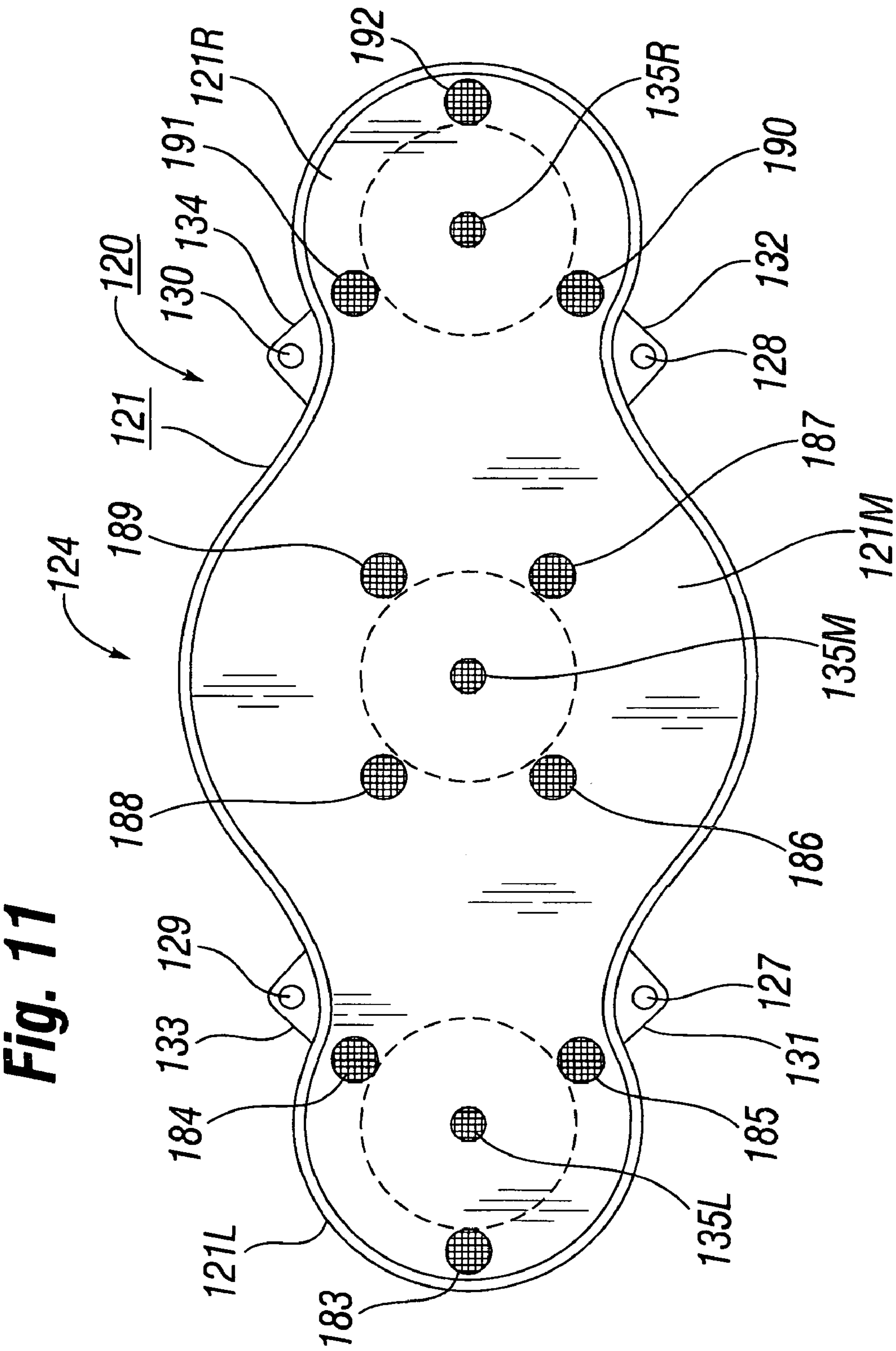
FIG. 11 is a partly diagrammatic upper plan view of the display apparatus of FIG. 10.

As shown in FIGS. 10 and 11, apparatus 120 includes an upper horizontally disposed cover panel 166 which is shaped similarly to platform 121. Cover panel 166 is supported above platform 121 in vertical alignment therewith by four vertically disposed stanchion rods 127, 128, 129, 130, which protrude perpendicularly upwards from base flanges 131, 132, 133, 134 that protrude horizontally outwards from flange wall 126. Flanges include front left and right flanges 131, 132, and rear left and right flanges 133, 134. As shown in FIG. 11, the flanges are located at the four respective intersections of curved peripheral edges of middle platform section 121M with left and right platform sections 121L, 121R.

FIG. 12 is a partly diagrammatic view of apparatus 120 which illustrates components of the apparatus that are used to provide variable air flow rates to bead discharge nozzles 135, to thereby produce bead fountains of variable heights.

As shown in FIG. 12, the mechanism for providing variable flow rate air to nozzles 135 includes a blower 144 which contains an electrically powered drive motor and fan (neither shown). Blower 144 has an air flow outlet port 147 to which is coupled an outlet manifold 148. Outlet manifold 148 has an inlet port 149 of approximately the same cross-sectional area as outlet port 147 of blower 144. Outlet manifold 148 also has three air outlet distribution ports 150L, 150M, 150R, each of which has a cross-sectional area approximately one-third that of manifold inlet port 149.

As shown in FIG. 12, outlet distribution ports 150L, 150M, 150R are connected to separate air flow control valves 151L, 151M, 151R by separate tubes 152L, 152M, 152R. The structure and function of air flow control valves 151 may be best understood by referring to FIGS. 12 and 13.

Figure 13:
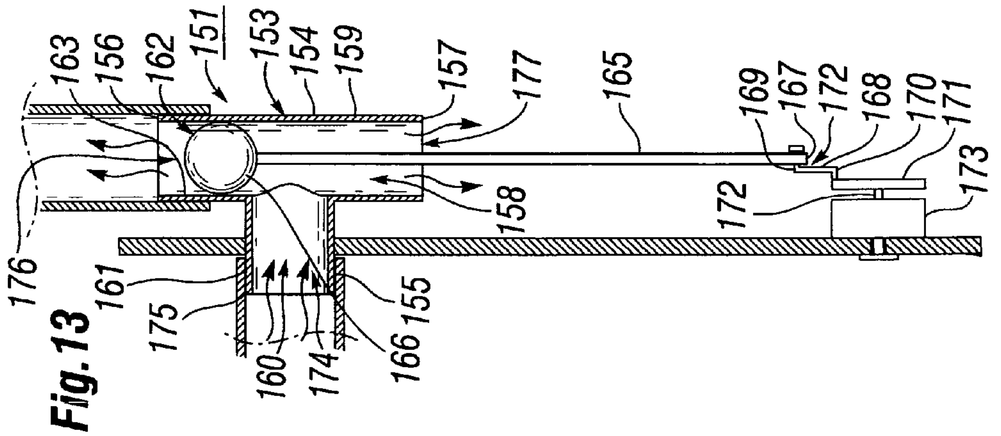
FIG. 13 is a fragmentary view of the apparatus of FIG. 10, showing a stepper motor actuated ball valve comprising part of the apparatus.

As shown in FIGS. 12 and 13, each air flow control valve 151 includes a T-shaped tubular body 153 which has a longitudinally elongated main tube 154, and a short tubular side-arm air inlet tube 155 which protrudes radially outwards from the longitudinal axis of the main tube. Side air inlet tube 155 is located midway between upper and lower transverse annular end walls 156, 157 of main valve tube 154. Main tube 154 has disposed longitudinally through its length a uniform cross-section bore 158 which is concentric with outer cylindrical wall surface 159 of the main tube. Also, side air inlet tube 155 has disposed through its length a uniform cross-section bore 160 which is concentric with outer cylindrical wall surface 161 of the side arm tube. Bore 160 of side air inlet tube 155 communicates at an inner end thereof with bore 158 through main tube 154, and preferably has the same diameter as the main tube bore.

As may be seen best by referring to FIG. 13, air flow control valve 151 includes a ball 162 which is longitudinally slidably located within main tube bore 158, in hermetically sealing contact with inner cylindrical wall surface 163 of the main tube. Ball 162 and valve body 153 are made of a materials which have a relatively low coefficient of sliding friction between the ball and inner wall surface 163 of the main tube, such as a ball made of wood, Teflon or nylon, and a main tube made of PVC plastic.

Valve 151 includes a straight, longitudinally elongated push rod 165 which is attached to ball 162, the push rod protruding from the outer spherical wall surface of the ball. Push rod 165 is pivotably attached at an outer end 167 thereof to the outer radial end 169 of crank arm 168. An inner radial end 170 of crank arm 168 is pivotably and eccentrically fastened to a circular drive wheel 171, i.e., at a point near the outer circumferential wall surface of the drive wheel. Drive wheel 171 is attached to the rotor shaft 172 of a stepper motor 173. With this arrangement, rotary motion of stepper motor rotor shaft 172 causes push rod 165 to reciprocally move ball 162 longitudinally within main tube bore 158.

Referring to FIG. 13, it may be seen that valve 151 has an inlet port 174 at the outer transverse end 175 of side air inlet tube 155, an air outlet port 176 at upper transverse end 156 of main tube 154, and a waste air discharge or exhaust port 177 at lower transverse end 157 of main tube 154.

The operation of valve 151 may be best understood by referring to FIG. 12 in addition to FIG. 13. As shown in those figures when stepper motor 173 receives electrical input signals which cause stepper motor rotor shaft 172 to rotate to a position which causes push rod 165 and valve ball 162 to be extended to their maximum upward positions within bore 158 of main tube 154, outlet port 176 of valve 151 is obstructed, thus resulting in no air flow to a bead discharge nozzle, such as nozzle 135L connected through a tube 178L to the bead discharge nozzle from that outlet port. In this case, all of the pressurized air supplied to inlet port 174 of valve 151L is exhausted through rear exhaust port 177 of the valve, as shown in FIGS. 12 and 13.

When stepper motor 173 is supplied with electrical signals which cause ball 162 to be moved to a location intermediate between its upper and lower limits, there will be an air flow from outlet port 176 of that valve which has an intermediate flow rate. This is illustrated by the configuration of middle valve 151M in FIG. 12. Finally, as shown in FIG. 12, when a stepper motor 173 is energized to fully retract push rod 165 as shown by the configuration of valve 151R, all of the flowing air input to air inlet port 174 of the valve is conducted through the valve. Thus, for this configuration of valve 151R, bead discharge nozzle 135R receives a maximum air flow, thus maximizing the height of a bead fountain issuing from that nozzle.

Importantly, for whatever position of valve ball 162 within bore 158 of main tube 154, the back pressure at inlet port 176 of valve 151 is the same, with all of the inlet air flowing out of the outlet port 176 with the ball fully retracted, and all of the air being expelled from the lower exhaust port 177 of the valve with the ball extended fully forward. This construction enables the air flow rate to each of a plurality of bead discharge nozzles, such as nozzles 135L, 135M, 135R in FIG. 12, to be separately and independently varied, with no undesirable cross-talk effects, i.e., decrease or increase of air flow rates to unselected valves.

As shown in FIGS. 10 and 11, multiple nozzle beads fountain display apparatus 120 according to the present invention include a plurality of illumination sources for illuminating beads 56 which are made airborne by air flowing upwards from bead discharge nozzles 135. The number and location of illumination sources is a matter of ordinary design choice, selected generally to provide a desired level of illumination of airborne beads 56. The example embodiment 120 of a three-nozzle apparatus shown in FIGS. 10 and 11 has three illumination sources 183, 184, 185 circumferentially spaced apart on a circle centered on left-hand bead discharge nozzle 135L, four illumination sources 186, 187, 188 and 189 spaced equidistant from one another on a circle centered on middle bead discharge nozzle 135M, and three illumination sources 190, 191, 192 spaced apart at equal distances on a circle centered on right-hand bead discharge nozzle 135R. Illumination sources 183-192 may be identical in construction and function to illumination sources 63 described above. Apparatus 120 optionally may also include additional illumination sources (not shown) which are mounted on a lower surface of cover panel 166, for providing downwardly directed illumination of airborne beads 56.

Figure 14:
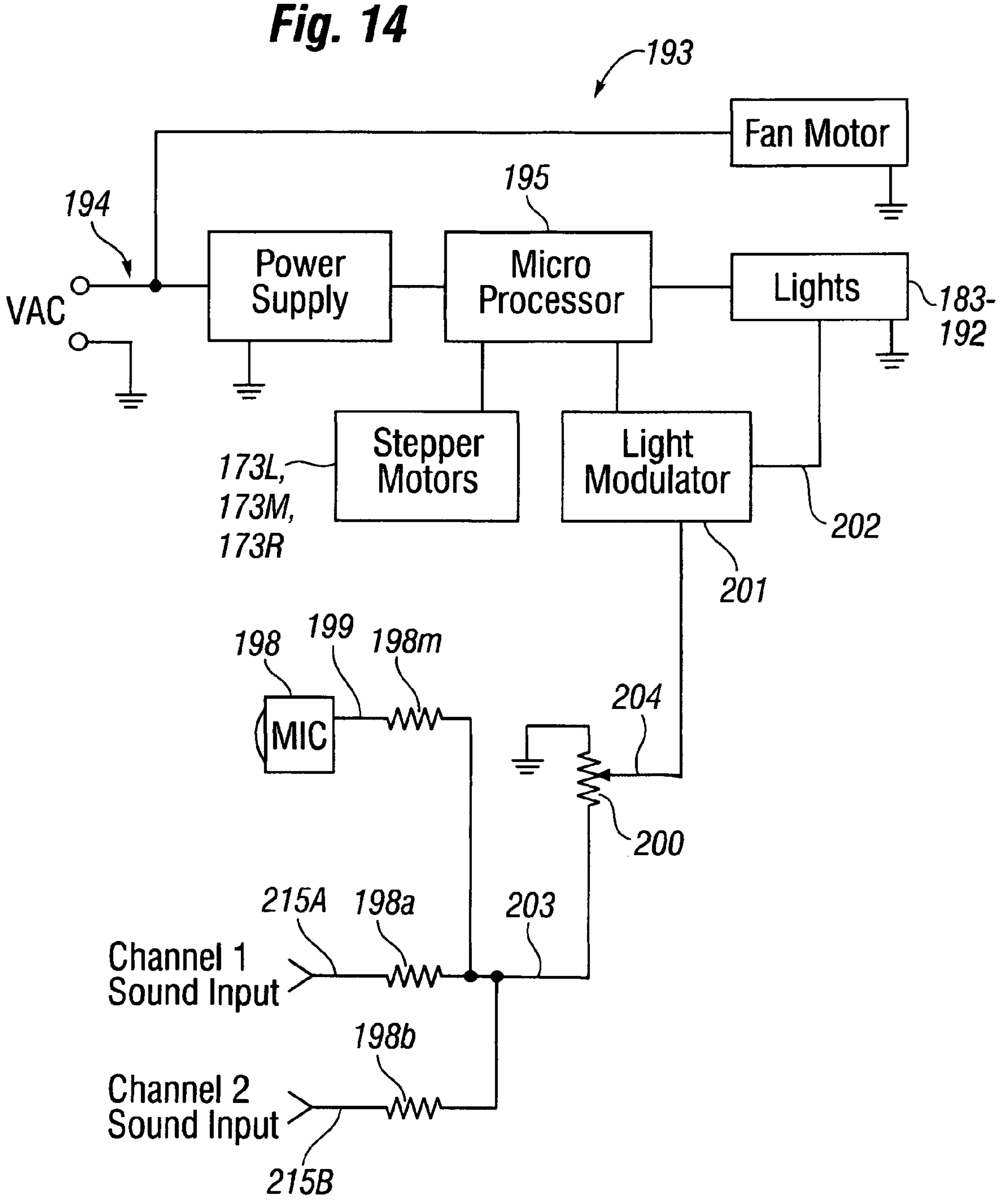
FIG. 14 is a simplified electrical block diagram of electronic control circuitry for the apparatus of FIGS. 10 and 11.

FIG. 14 is a simplified electrical block diagram of an electronic control system 193 for apparatus 120. As shown in FIG. 14, electronic control circuitry 193 includes a two-conductor power cord 194 for providing AC power to the apparatus. Electronic control circuitry 193 also includes a microprocessor 195 for providing variable drive currents to electrical lamps in illumination sources 183-192, to blower 144, and to stepper motors 173L, 173M, 173R for controlling air flow through bead discharge air supply valves 151L, 151M and 151R.

As shown in FIG. 14, electronic control circuitry 193 preferably includes a microphone 198 which has an output terminal 199 on which electrical signals are produced in response to ambient sounds such as music within the reception range of the microphone. Electrical signals proportional to sounds received by microphone 198 are coupled through a summing resistor 198*m* from microphone output terminal 199 to input terminal 203 of a volume control potentiometer 200.

Potentiometer 200 has a wiper output terminal 204 which is connected to an input terminal of a sound actuated light modulator amplifier 201. Optionally, as shown in FIG. 14, additional audio frequency signals from an audio CD or tape player, etc., may be input from input terminals 215*a*, 215*b* through summing resistors 198*a*, 198*b* to control potentiometer 200.

Light modulator amplifier 201 has an output terminal 202 which is connected to lights 183-192. As those skilled in the art will recognize, the circuitry 193 as thus described enables electric current in lamps of illumination sources 183-192 to be varied in response to sounds received by microphone 198, at sound amplitude levels adjustable by moving control knob 204 on the potentiometer to a desired position.

Referring still to FIG. 14, it may be seen that microprocessor 195 provides control signals for stepper motors 173L, 173M and 173R. In accordance with pre-programmed instruction, signals from microprocessor 195, sound actuated signals from light modulator amplifier 201, or a combination of both, microprocessor 195 issues a sequence of command signals to stepper motors 173L, 173M, and 173R. Stepper motor shaft rotations in response to the sequential signals from microprocessor 195 cause valves 151L, 151M and 151R to be actuated to produce variable air flow rates to bead discharge nozzles 135. The variable air flow rates in turn result in the heights of bead fountains produced by the nozzles to vary rhythmically in pre-programmed and/or sound controlled sequences which may be synchronized with music. The fountain height variations, in conjunction with illumination of varying intensities and colors produced by the illumination sources, result in a highly pleasing "dancing waters" type display.

FIG. 18 is an electrical block diagram of a modification 213 of electronic control circuitry 193 for the apparatus 120.

As shown in FIG. 18, modified electronic control circuitry 213 includes functional modules and components which perform functions similar to those described above for the circuitry shown in FIGS. 8, 14 and 17. Modified control circuitry 213 includes in sound pre-amplifier 214 additional sound input channel terminals 215 and 216 in addition to ambient sound microphone input terminal 217. One or more of the additional sound input terminals are connected to an audio frequency range signal source such as an audio CD or tape player, MIDI device, etc. and summed in amplifier 214.

As is shown in FIG. 18, modified electronic control circuitry 213 includes a pattern generator driver module 218 which produces under control of programmed output command signals from microprocessor 195 enabling signals labeled Pattern 1, Pattern 2, Pattern 3 for groups of illumination sources for left bead discharge nozzle 135L, middle bead discharge nozzle 135M, and right bead discharge nozzle 135R, respectively. Modified electronic control circuitry 213 also includes a switch 219 for configuring the circuitry alternatively in an auto-run mode, or in a MIDI (Musical Instrument Digital Interface) signal input control mode in which this asynchronous serial communication protocol input into the micro-processor triggers a set of instructions in the program. The micro-processor waits for the MIDI incoming data and executes the pre-programmed light colors and patterns and sends out pulses to the stepper motors for controlling the valves, which in turn controls the airflow to each nozzle.

Figure 15:
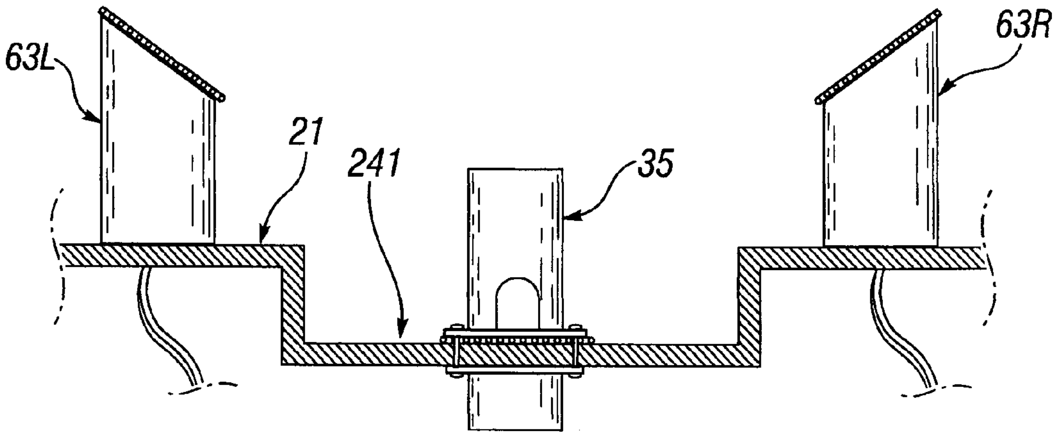
FIG. 15 is a fragmentary, partly sectional view of a first modification of the apparatus of FIG. 10, comprising a rectangular cross-section bead reservoir.

FIGS. 15 and 16 illustrate modifications of a support platform 21 for apparatus 20, or support platform 121 for apparatus 120. In the modification shown in FIG. 15, platform 21 or 121 is modified by forming a rectangular well-shaped relief 241 in the platform, in which a bead discharge nozzle 35 or 135 is centrally located. The relief serves as a catch basin or reservoir for falling beads 56, thus ensuring that a supply of beads for recirculating through a nozzle is not temporarily interrupted.

The modification shown in FIG. 16 is similar in construction and function to that shown in FIG. 15 and described above, except that web-shaped relief 242 in FIG. 16 has an inverted frusto-conic shape.

In the example embodiments of the invention described above low density spherical beads in the diameter range of about 3 mm to about 5 mm were found to provide satisfactory fountain-stimulating effects in which the beads were propelled to heights of about 3-4 feet. For displays in which it is desired to propel beads to greater heights, beads having a larger diameter, e.g., up to about 13 mm or larger may be used.

Figure 19:
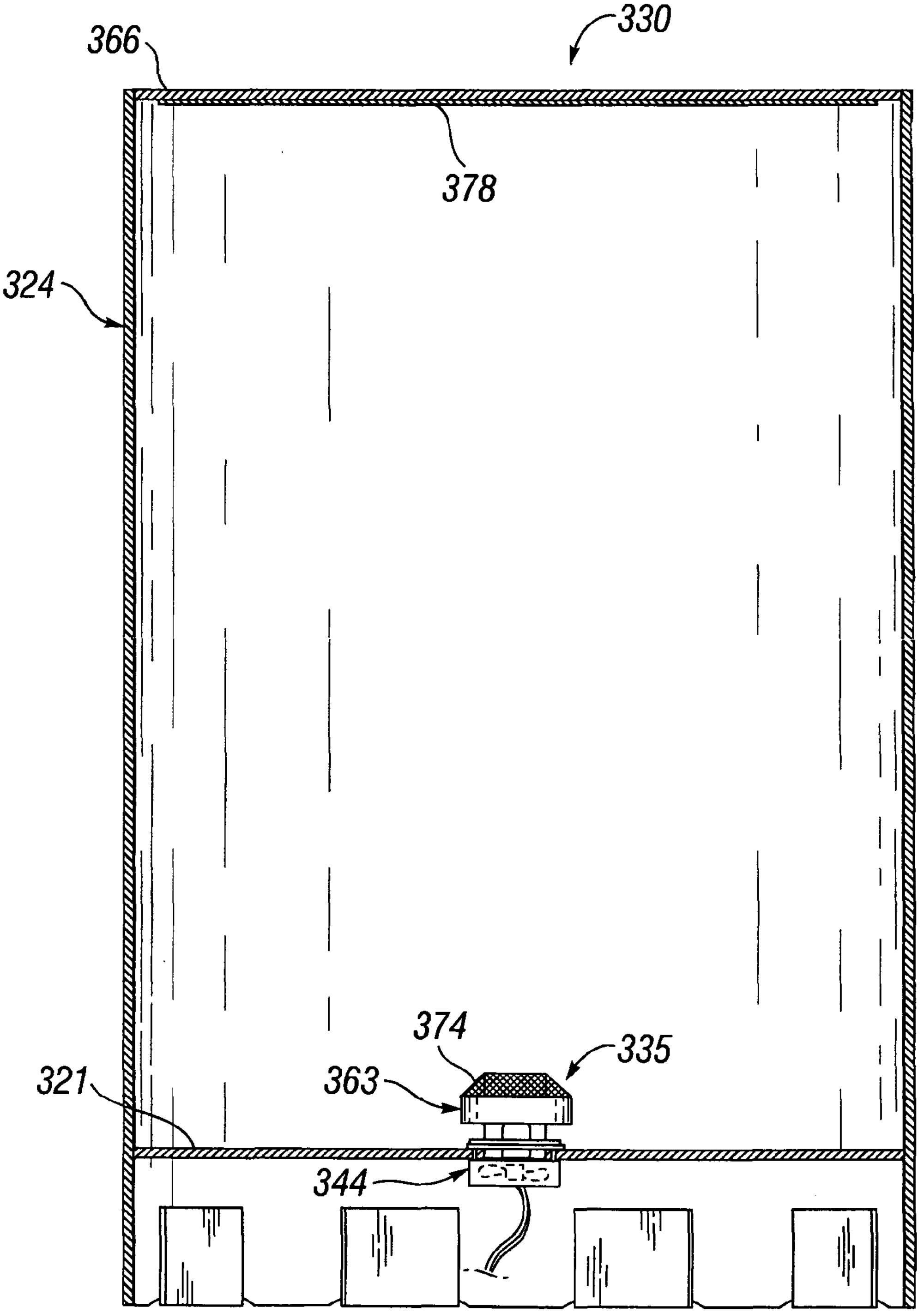
FIG. 19 is a vertical longitudinal sectional view of a modification of the apparatus shown in FIGS. 1 and 2.
Figure 21:
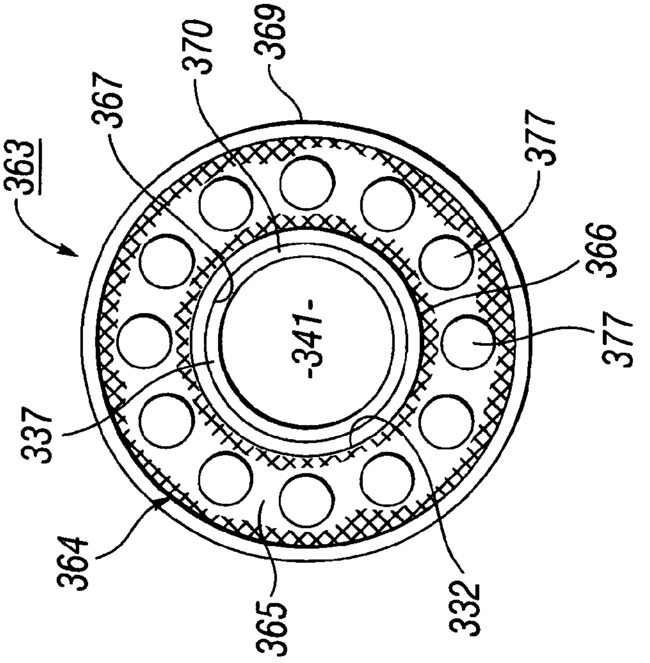
FIG. 21 is an upper view of the nozzle and illumination source of FIG. 20.
Figure 20:
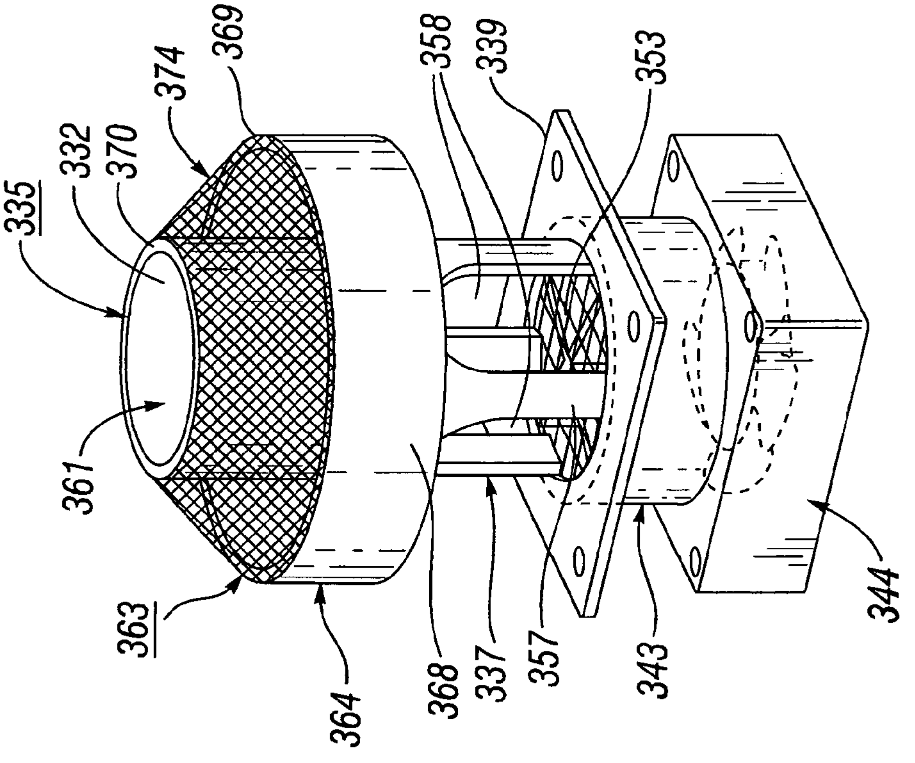
FIG. 20 is a fragmentary perspective view of the apparatus of FIG. 19 on an enlarged scale, showing a bead discharge nozzle and illumination source thereof.
Figure 22:
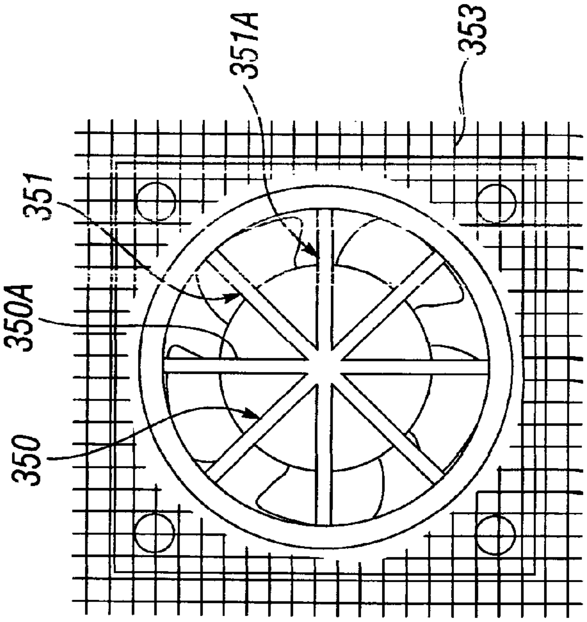
FIG. 22 is a transverse sectional view of a modification of the flow straightener duct of FIGS. 4 and 5.

FIGS. 19-21 illustrate a modification 320 of apparatus 20 shown in FIGS. 1-9 and 17 and described above. FIG. 22 illustrates a modified flow straightener duct for use with various embodiments of the apparatus.

Referring to FIGS. 19-21, it may be seen that a modified recirculating beads fountain display apparatus 320 according to the present invention has a form factor, i.e., gross construction shape, similar to that of apparatus 20 described above. Thus, modified apparatus 320 has a flat horizontally disposed platform 321 which has a generally semi-circular cross-sectional shape, and a semi-cylindrically shaped housing 324 which has disposed longitudinally therethrough a semi-circular bore. Platform 321 fits conformally within a lower part of the housing bore.

As shown in FIGS. 19-21, apparatus 320 also includes a tubular, generally cylindrically shaped bead discharge nozzle 335 which protrudes perpendicularly upwards from upper surface 336 of platform 321. Preferably, bead discharge nozzle 335 is centrally located on semi-cylindrically shaped platform 321.

As shown in FIGS. 19-21, bead discharge nozzle 335 has a construction substantially similar to that of bead discharge nozzle 35 of the basic embodiment 20 of the apparatus described above. However, bead discharge nozzle 335 differs from nozzle 35 in the respect that nozzle 335 has attached thereto an annular ring-shaped illumination source 363, which replaces the plurality of illumination source 63 employed in basic embodiment 20.

Referring first to characteristics of modified bead discharge nozzle 335 which are similar to those of nozzle 35 described above, it may be seen that nozzle 335 includes a vertically elongated, hollow circular cross-section cylindrical nozzle tube 337. The lower transversely disposed end of nozzle tube 337 protrudes perpendicularly upwards from a square base plate 339.

As shown in FIG. 20, apparatus 320 includes a flow-straightener duct 343 which is longitudinally aligned with and located between an aperture 340 through base plate 339, and the outlet port of a rotary box fan 344 located below platform 321.

Flow straightener duct 343 may be similar in construction to flow straightener duct 43 described above, which, as shown in FIG. 5, contains flow straightener plates 50, 51 which are disposed through the bore 40 of straightener tube 93 and intersect perpendicularly of the longitudinal center line of the bore. However, the present inventor has found that it is preferable to add additional flow straightener plates for bead discharge nozzles which have relatively small bores, e.g., less than about ¾ inch. Thus, to minimize the amount of non-axial and flow through small bore straightener tubes, the construction shown in FIG. 22 has been found preferable.

As shown in FIG. 22, a modified flow straightener duct 343 utilizes four flow straightener plates 350, 351, 350A, and 351A which intersect at the longitudinal center line of bore 348 through duct 343, and are spaced circumferentially apart at 45-degree intervals.

Referring to FIGS. 20-22, it may be seen that bead discharge nozzle 335 includes a transversely disposed, perforated nozzle screen 353 which is located between the bore exit opening 349 of straightener duct 343 and the lower entrance opening to bore 341 of nozzle tube 337. The purpose of nozzle screen 353 is to prevent beads from entering flow straightener duct 343. Thus, the mesh size of nozzle screen 353 is chosen to be smaller than the diameter of beads 56, e.g., 2 mm for 3 mm to 5 mm diameter beads.

Referring to FIGS. 19 and 20, it may be seen that bead discharge nozzle tube 337 of bead discharge nozzle 335 has cut through a lower portion of the cylindrical wall 357 thereof a plurality of openings 358 for ingesting beads 56 into a stream of air produced by box fan 344 and directed upwardly into bore 341 of the nozzle tube. As shown in FIG. 20, bead entrance openings 358 into bead discharge nozzle tube 337 consists of four identically shaped, circumferentially symmetric arch-shaped notches which extend upwards from annular base 338 of the nozzle tube into wall 357 of the nozzle tube.

FIGS. 19-21 illustrate how the construction of bead discharge nozzle 335 is modified from that of bead discharge nozzle 35 to incorporate an integral illumination source 363.

As shown in FIGS. 19-20, illumination source 363 of modified display apparatus 320 includes a cylindrical cup-shaped body 364. Body 364 has an annular ring-shaped base 365 which has disposed longitudinally through its thickness dimension a central coaxial bore 366. Bore 366 receives therethrough the upper end of nozzle tube 337, the outer cylindrical surface of which is fastened to the inner circumferential wall 367 of the bore by any suitable means, such as ultrasonic bonding, adhesive bonding, integral injection molding, or the like.

As shown in FIGS. 20 and 21, cylindrical body 364 of illumination source 363 includes a cylindrically-shaped flange wall 368 which extends perpendicularly upwards from the outer circumferential edge of base 365 of the body. As shown in FIG. 20, the upper annular edge wall 369 of flange wall 368 is located below, i.e., longitudinally inwards of the upper annular edge wall 370 of bead discharge nozzle tube 337. As shown in FIGS. 19 and 20, illumination source 363 includes a light transmissive, bead blocking screen 374 which has the shape of a frusto-conic section and is disposed between upper annular edge wall 369 of illumination source body 364 and upper annular edge wall 370 of bead discharge nozzle tube 337.

Referring to FIG. 21, it may be seen that illumination source 363 includes a plurality of circumferentially spaced apart light sources, such as light emitting diodes (LED's) 377 which protrude upwards from the upper surface 378 of ring-shaped illumination source base 379. LED's 377 are electrically powered in the same fashion as lamps 67 described above for the basic embodiment, to thus illuminate beads propelled from bead discharge nozzle tube 337.

The novel design of modified bead discharge nozzle 335 and integral illumination source 363 provides the advantageous features of positioning light sources such as LED's 377 close to the path of beads discharged from nozzle 335, thus maximizing illumination of beads. Also, locating LED's 377 above the bead entrance ports 358 of nozzle 337 ensures that there are no obstructions to beads entering the ports, and allows the diameter of the apparatus to be minimized.

Apparatus 320 may optionally include additional light sources such as LED's (not shown) located below upper wall 366 of enclosure. Also, apparatus 320 may optionally include a reflector 378 located in an upper portion of enclosure 364, such as a reflector sheet fastened to a lower surface of upper enclosure wall 366, for reflecting light emitted by illumination source 63 or 363 downwards onto beads levitated above bead discharge nozzle 35 or 335.

Optionally, some or all of illumination sources 63 or 363 may be of a type which emits ultraviolet radiation, in which case beads 56 would be made from or coated with a material such as fabric whitener to make the beads fluoresce in response to ultraviolet irradiation.

The present inventor has also discovered that when illumination sources 63 or 363 are pulsed on and off at particular repetition rates, those rates may be varied to produce a stroboscopic effect, in which groups of beads having approximately the same velocity appear to remain motionless, or move slowly upwardly or downwardly at velocities different than their actual velocities.

Apparatus 20 or 320 may optionally have a transparent panel enclosure in place of screen 61, in which case upper wall 66 or 366 would be perforated to allow escape of pressurized air supplied by blower 44 or fan 344.

Figure 24:
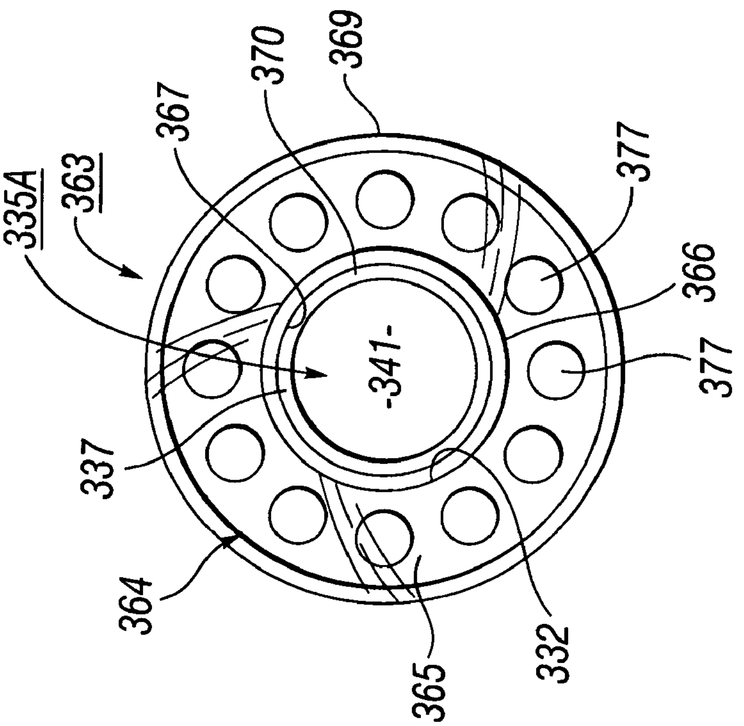
FIG. 24 is an upper view of the bead discharge nozzle and illumination source of FIG. 23.
Figure 23:
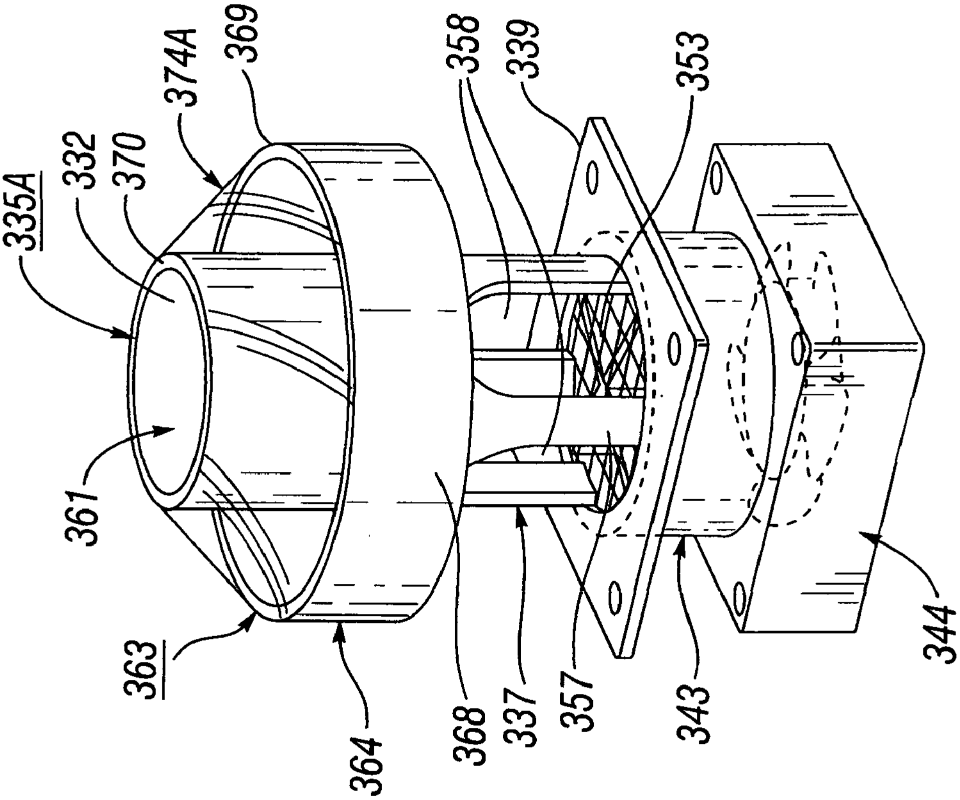
FIG. 23 is a fragmentary perspective view of the apparatus of FIG. 19 on an enlarged scale, showing a modification of the bead discharge nozzle and illumination source shown in FIG. 20.

FIGS. 23 and 24 illustrate a modification 363A of the illumination source 363 shown in FIGS. 20 and 21 and described above. Modified illumination source 363A utilizes in place of bead blocking screen 374 a light transmissive, preferably transparent frusto-conically shaped shell 374A made of a light transmissive synthetic plastic such as polycarbonate or acrylic plastic.

Figure 25:
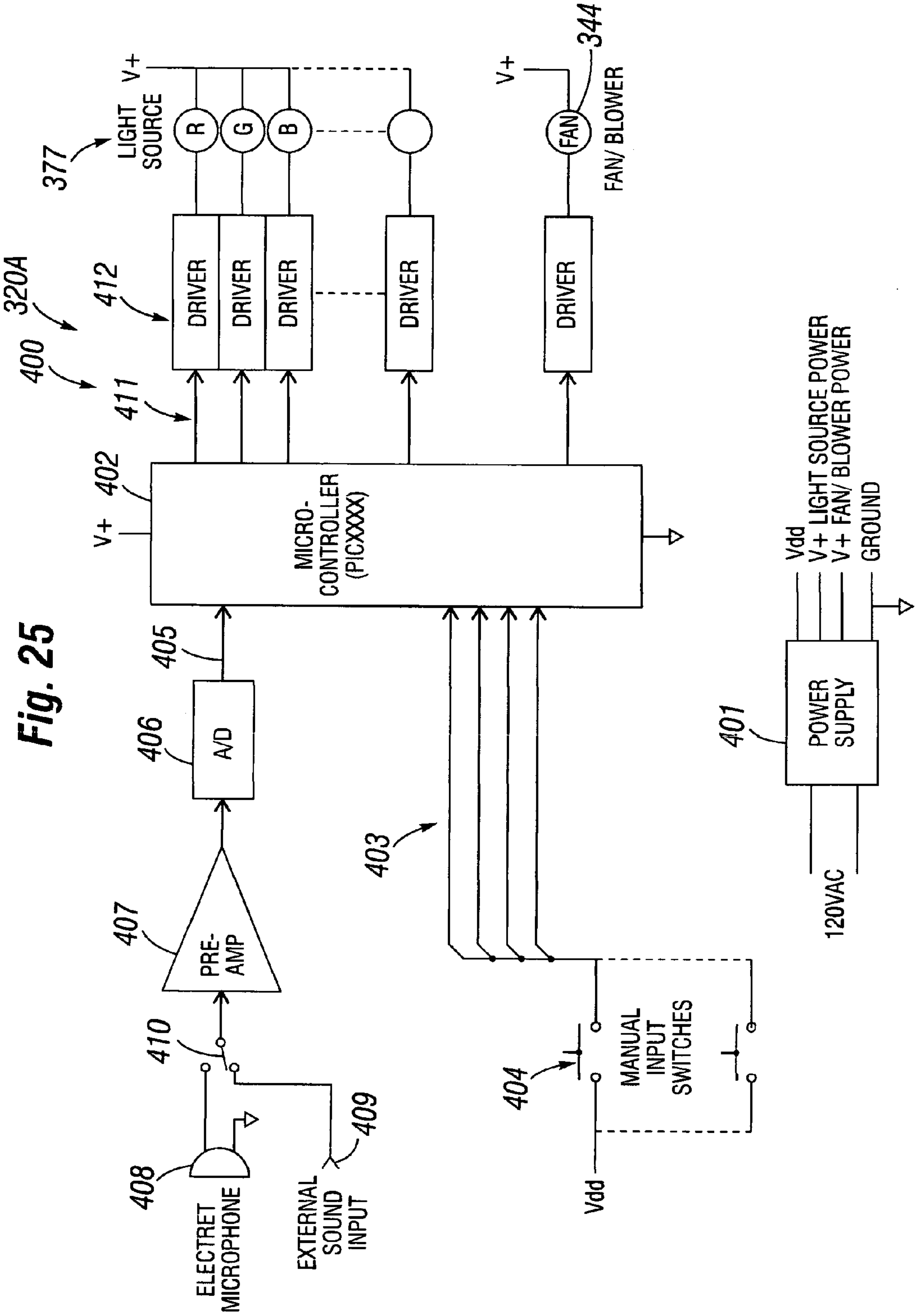
FIG. 25 is a block diagram of a modification of electronic control circuitry for the apparatus of FIG. 19.
Figure 26:
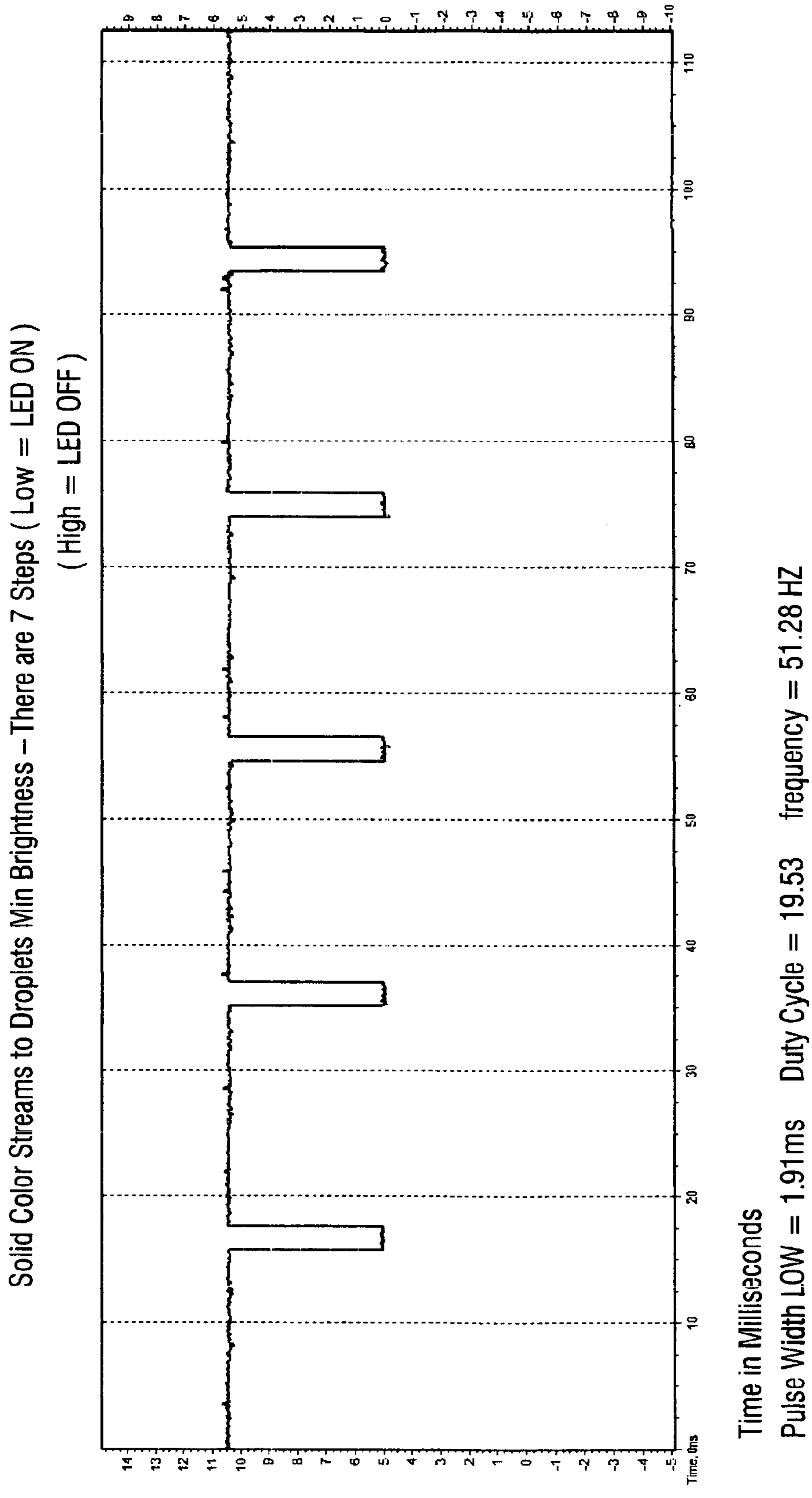
FIG. 26 is a timing diagram showing a minimum duty cycle current or voltage drive waveform for energizing an LED light source of FIG. 25 to emit light at a pre-determined minimum brightness level.
Figure 27:
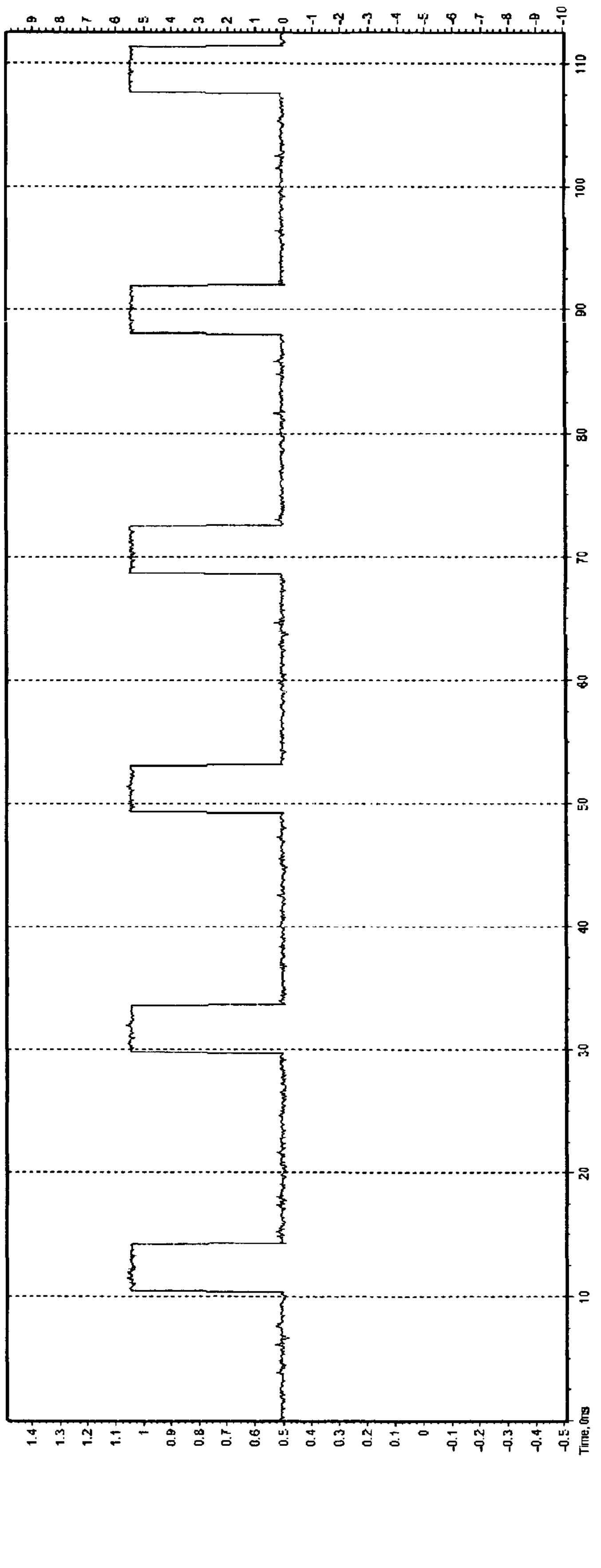
FIG. 27 is a timing diagram similar to that of FIG. 26, but showing the signal PULSE WIDTH MODULATED (PWM) to produce a maximum duty cycle, maximum brightness LED drive current.

FIGS. 25-27 illustrate a modification of the beads fountain display apparatus 320 shown in FIGS. 19-20 and described above. As shown in FIG. 25, modified beads fountain display apparatus 320A utilizes modified electronic control circuitry 400 for supplying electrical drive signals for LED light source 377 and fan 344 shown in FIGS. 20, 21, 23 and 24.

Referring to FIG. 25, it may be seen that electronic control circuitry 400 includes a power supply 401 for converting alternating mains current, e.g., 120 V @ 60 Hz, to various regulated D.C. voltages utilized by other components of the control circuitry.

Electronic control circuitry 400 includes a microprocessor or micro-controller 402 which has input interrupt ports 403 that are connected to manually selectable mode control switches 404. As shown in FIG. 25, micro-controller 402 also has an interrupt port 405 which is connected to the output port of an Analog to Digital converter (A/D) 406. Electronic control circuitry 400 also includes a pre-amplifier 407 which has one input port connected to the output port of a microphone 408 which is switchable to a second input port connected to an external sound input jack 409. The latter is connectable to an audio frequency electrical output signal outputted from a radio, CD player or the like. Thus an audio frequency signal output from A/D converter 406 and connected to interrupt input port 405 of micro-controller 402 can be selected by a switch 410 to be proportional to external ambient sounds, or to audio frequency signals from a radio, CD player or the like.

As shown in FIG. 25, micro-controller 402 electronic control circuitry 400 also has multiple output interrupt ports 411, each of which is connected to the input terminal of a separate current driver 412. Each current driver 412 has an output terminal which is connected to the cathode of an LED light source 377 or the negative terminal of fan motor 344, and the anode of the LED or positive terminal of the fan motor is connected to a regulated positive DC voltage supplied by power supply 401, as for example, 12 volts D.C.

Micro-controller 402 includes therein program instructions contained in a Read Only Memory (ROM) component of the micro-controller. The program instructions are responsive to signals on the interrupt input ports 403, 405 of micro-controller 402 in producing pre-programmed sequences pulses of pre-determined duration and frequency at the output ports 411 of the micro-controller. The pulse sequences for each of the multiple output ports 411 are individually controllable and in general differ from one another.

FIGS. 26 and 27 illustrate a typical sequence of Pulse Width Modulated (PWM) signals output on output interrupt ports 411 of micro-controller 402, and input to current drivers 412 to thus select and vary the drive currents and hence intensity of LED light sources 377. As shown in FIG. 26, a pulse train having a frequency of about 5 Hz and duty input of about 10 percent causes a selected LED Light source 377 such as an R (red) LED to emit light at a relatively low intensity level.

As shown in FIG. 27, the width of the low, on period of the pulses output from a current driver 412 may be increased to a duty cycle of about 75% causing the intensity of a selected LED to increase by factor of about 7.5 to 1. The rate at which the pulse width at the output port 411 for a particular LED light source 377 varies is under program control, and may vary slowly, as for example, over a period of several seconds, or rapidly, as for example multiple times per second. Also, it should be understood that the program instructions contained in the ROM of micro-controller 402 may vary the intensity of the Red®, Green (G) and Blue (B) LED drive pulse widths in unison, or in any arbitrary, pre-programmed arrangement, to thus produce an aesthetically pleasing illumination of levitated beads.

Also, as may be understood by referring to FIG. 25, switches 404 may select an operating mode of electronic control circuitry 400 in which illumination sequences of LED's 377 are responsive to audible signals such as voice or music input on microphone 408 or external sound input jack 404, which signals are amplified by pre-amplifier 407, converted to a digital signal by A/D converter 406, and input to interrupt input port 405 of micro-controller 402.

As shown in FIG. 25, the speed of fan motor 344 and hence output air flow rate of the fan and therefore the height of levitated beads may also be varied in accordance with a pre-programmed sequence and/or in response to audio signals input from microphone 408 or external sound input jack 409.

Figure 28:
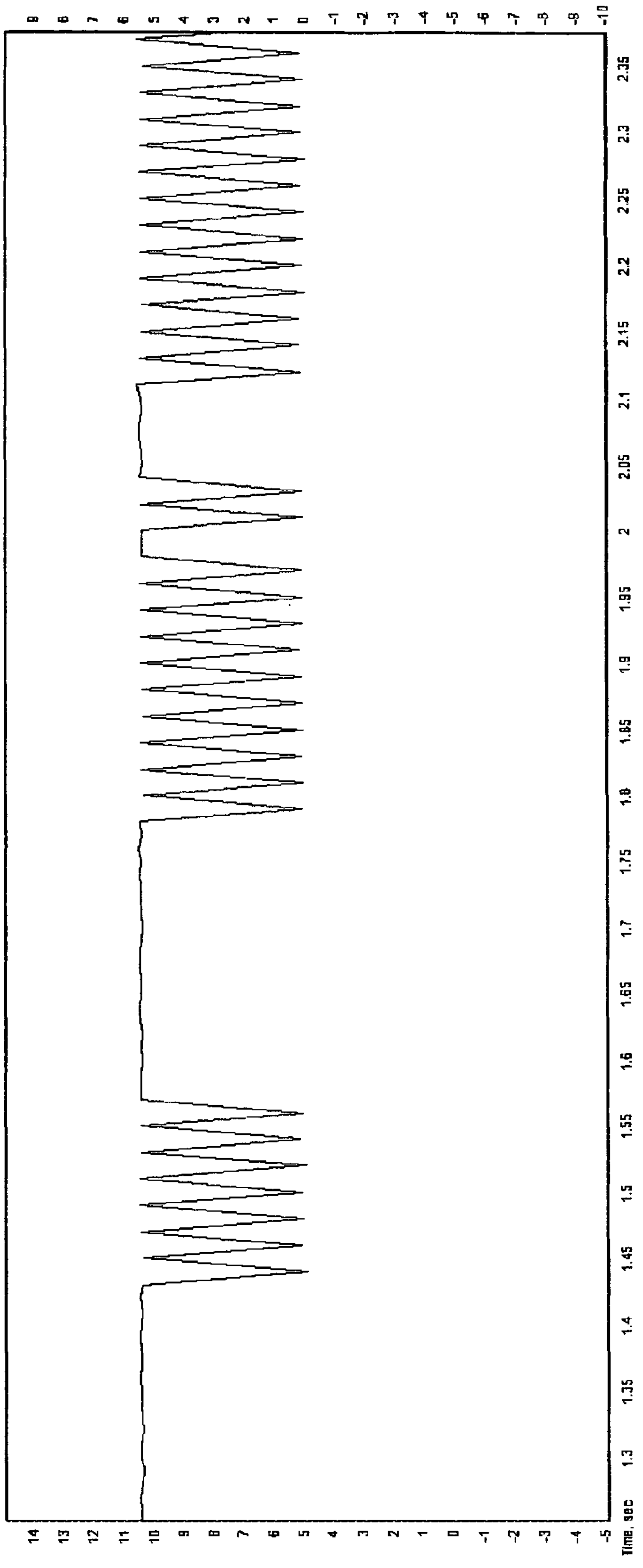
FIG. 28 is a timing diagram showing a pulse width modulated pulse train of the type shown in FIGS. 26 and 27 switched on and off at a stroboscopic frequency range of between about 2 cycles per second to about 20 cycles per second.

FIG. 28 illustrates an operational mode of electric control circuitry 400 which causes beads fountain display apparatus 320A to produce a unique display effect, in which levitated beads appear to move more rapidly, slow down to a stop, or even reverse with a pre-programmed sequence and/or in response to audio signals input from microphone 408 or external sound input jack 409.

FIG. 28 illustrates an operational mode of electric control circuitry 400 which causes beads fountain display apparatus 320A to produce a unique display effect, in which levitated beads appear to move more rapidly, slow down to a stop, or even reverse directions. This effect is implemented by pulsing the LED illumination sources 377 at varying frequencies to thus effect stroboscopic illumination of the levitated beads. As shown in FIG. 1, during the ON portion of a stroboscopic illumination cycle, selected LED light sources 377 are energized by a 50 percent duty cycle triangular waveform. Optionally, the drive current wave form could be a rectangular wave of varying duty cycle, as shown in FIGS. 26 and 27 and described above.

As shown in FIG. 28, the LED drive current waveform in a stroboscopic mode of operation consists of a 50-60 pulses per second pulse train, which is switched off and on at a rate of about 5 pulse trains per second to 10 pulse trains per second. However, the exact range of varying stroboscopic frequencies depends on the speed and height of the beads, and may vary over a different range, for example, for about 1 pulse train per second to 20 or 30 pulse trains per second.

Also, it should be noted that drive current and hence air flow rate of fan 344 may be varied separately from or in unison with variation in drive intensity of LED light source 377.

What is claimed is:

1. An apparatus for producing a visual display of moving airborne beads, said apparatus comprising;

a. at least a first tubular bead discharge nozzle, said nozzle having at least one air inlet opening at a first transversely disposed end thereof for receiving flowing pressurized air, at least one bead inlet port in a longitudinally disposed wall of said nozzle and at least one bead discharge outlet opening at a second transversely disposed end of said nozzle for discharging beads into the air.

b. a pressurized air source for providing pressurized air to said inlet opening of said bead discharge nozzle, c. a collection platform having a flat horizontally disposed upper surface for collecting beads which have been discharged into the air and subsequently fallen, and conveying said collected beads to said bead inlet port of said bead discharge nozzle solely in response to a venturi effect which cause transversely disposed air-flow into said bead inlet port resulting from longitudinal air-flow through said bead discharge nozzle, said bead discharge nozzle including a tubular body having disposed longitudinally therethrough a bore, a lower end opening of which comprises said air inlet opening, an upper end opening of which comprises said bead discharge outlet opening, and a bead inlet port comprising an aperture which penetrates a wall of said tubular body and communicates with said bore therethrough, said bead discharge nozzle protruding upwardly from said collection platform to thus position said bead inlet port at least partially above said upper surface of said platform, and d. an illumination source for illuminating airborne beads discharged from said bead discharge nozzle, said illumination source comprising;

i a light emitter support platform fastened to said tubular body of said bead discharge nozzle, and ii at least one electrically energizable light emitter mounted on said light emitter support platform.

2. The apparatus of claim 1 wherein said light emitter support platform is further defined as being fastened to an outer wall surface of said bead discharge nozzle.

3. The apparatus of claim 2 wherein said light emitter support platform is further defined as being located between said bead inlet opening and said bead discharge outlet opening of said tubular body.

4. The apparatus of claim 3 wherein said light emitter support platform is further defined as including a hollow cup-shaped shell which fits coaxially over said tubular body of said bead discharge nozzle.

5. The apparatus of claim 4 wherein said light emitter support platform is further defined as including, a. an annular ring-shaped base which terminates a lower end of said cylindrical cup-shaped shell, said base having a central coaxial bore which receives therethrough and is fixed with respect to an upper longitudinally disposed part of said bead discharge nozzle, b. a plurality of circumferentially spaced apart light sources mounted to said annular ring-shaped base wall of said cylindrical cup-shaped shell, said light source producing upwardly directed beams of light when energized, and c. a bead blocking screen located above said light sources to prevent beads from accumulating thereon.

6. The apparatus of claim 5 wherein said bead blocking screen includes a tapered shell which has a lower base rim fixed to an upper rim of said cylindrical cup-shaped body, and an upper rim of smaller diameter than said base rim fixed to an outer surface of said bead discharge nozzle.

7. The apparatus of claim 6 wherein said tapered shell has a frusto-conical shape.

8. The apparatus of claim 6 wherein said screen is further defined as having a mesh construction having mesh openings therethrough which are of a smaller diameter than said beads.

9. The apparatus of claim 6 wherein said screen is further defined as being made of a thin light transmissive material.

10. The apparatus of claim 1 further including electronic control circuitry for individually varying at least one of intensity and color of said light sources in response to stimuli signals comprising at least one of ambient sounds, external electronic control signals, and pre-programmed control signals.

11. The apparatus of claim 10 wherein said electronic control circuitry is further defined as including circuit elements for pulsing said light sources on and off in response to said stimuli signals in a frequency range effective in stroboscopically illuminated airborne beads.

12. The apparatus of claim 11 wherein said frequency range extends from about 1 cycle per second to about 30 cycles per second.

13. The apparatus of claim 10 wherein said electronic control circuitry includes circuitry for varying the output air flow rate from said pressurized air source in response to said stimuli signals.

14. The apparatus of claim 13 wherein said electronic control circuitry includes Pulse Width Modulation (PWM) circuitry for varying at least one of the intensity of said illumination sources and said flow rate of said pressurized air source.

15. The apparatus of claim 14 wherein said electronic control circuitry is further defined as including a micro-controller.

16. The apparatus of claim 15 wherein said pre-programmed control signals reside in electronic memory operatively interconnected with said micro-controller.

* * * * *